United States Patent

Miller et al.

[15] 3,635,711

[45] Jan. 18, 1972

[54] METHOD AND AUTOMATED APPARATUS FOR PHOTOCOMPOSING

[72] Inventors: Wesley W. Miller, Wyncote; Gerold Litschi, Lansdale; Warren A. Bixler, Warminister, all of Pa.

[73] Assignee: W. R. Grace & Co., New York, N.Y.

[22] Filed: June 6, 1969

[21] Appl. No.: 830,972

[52] U.S. Cl. ....................96/35.1, 96/36

[51] Int. Cl. ....................G03c 5/00

[58] Field of Search ....................96/35.1, 36; 134/1

[56] References Cited

UNITED STATES PATENTS

| | | | |
|---|---|---|---|
| 3,074,869 | 1/1963 | Workman | 96/35.1 |
| 3,462,267 | 8/1969 | Giangualano et al. | 96/35.1 |
| 3,081,168 | 3/1963 | Leekley et al. | 96/35.1 |
| 3,129,098 | 4/1964 | Kitson | 96/35.1 |
| 3,422,479 | 1/1969 | Jeffee | 134/1 |
| 3,405,916 | 10/1968 | Carmichael | 134/1 |
| 2,967,119 | 1/1961 | Gutterman | 134/30 |

*Primary Examiner*—J. Travis Brown
*Assistant Examiner*—Edward C. Kimlin
*Attorney*—Eugene M. Bond and Kenneth E. Prince

[57] ABSTRACT

The disclosed invention is for an automated photocomposing apparatus and improvements in a method of operating such a photocomposing apparatus. The apparatus includes (A) means for storing and supplying severed sheets of plastic film; (B) means for dispensing and leveling a liquid photocurable composition on a sheet of plastic film; (C) a housing having at one end an actinic light source and at the other end a support adapted to receive thereon a supported liquid photocurable composition which on exposure to actinic light through an image bearing transparency becomes selectively insolubilized in the exposed portions thereof; (D) a vertically disposed posterior photocuring station; (E) an etching bath energized by ultrasonic energy; (F) a washing bath; (G) an air-drying station disposed adjacent the washing bath; and (H) a horizontally disposed posterior photocuring station for finally curing the processed plate. A plurality of conveying means transfer sheets from location (A) to location (H) in automated sequence. The invention is especially useful in preparing a developable printing plate from a liquid photocurable composition.

5 Claims, 31 Drawing Figures

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

PATENTED JAN 18 1972

SHEET 06 OF 20

3,635,711

INVENTORS
WESLEY W. MILLER
GEROLD LITSCHI
WARREN BIXLER

BY Eugene M. Bond

ATTORNEY

INVENTORS
WESLEY W. MILLER
GEROLD LITSCHI
WARREN BIXLER

BY

ATTORNEY

PATENTED JAN 18 1972

3,635,711

SHEET 08 OF 20

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER
BY Eugene M. Bond
ATTORNEY INVENTORS
WESLEY W. MILLER
GEROLD LITSCHI
WARREN BIXLER
BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER
BY Eugen M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER
BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

INVENTORS
WESLEY W. MILLER
GEROLD LITSCHI
WARREN BIXLER

BY Eugene M. Bond
ATTORNEY

METHOD AND AUTOMATED APPARATUS FOR PHOTOCOMPOSING

This invention relates to an automated apparatus and improvements in a method of operating such an apparatus for processing photocuring a photocurable composition. More particularly, the present invention relates to an apparatus having (A) means for storing and supplying severed sheets of plastic film; (B) means for dispensing and leveling a liquid photocurable composition on a sheet of plastic film received from said supply; (C) an exposure station including a housing having at one end an actinic light source and at the other end a support adapted to receive thereon a supported liquid photocurable composition which on exposure to actinic light through an image-bearing transparency becomes selectively insolubilized in the exposed portions thereof; (D) a vertically disposed posterior photocuring station; (E) an etching bath energized by ultrasonic energy; (F) a washing bath for subsequently cleaning a plate after said etching bath; (G) an air-drying station disposed adjacent washing bath; and (H) a horizontally disposed posterior photocuring station for finally curing the processed plates.

Numerous devices are available in the prior art which are useful for photocomposing. However, where accurate placement of images in a predetermined relative position over a liquid photocurable composition for accurate duplication of the images is required, devices available to the art have not proved commercially practical. Typically, the prior art devices have been complex and have had limited ability to permit exacting duplication in photocomposing with maximum efficiency. In most instances, devices available to the art require extensive manual operations which further limit the efficiency and accuracy of duplication with human error and skill a constant dependent factor. It has now been found that by the practice of the present invention, an automated photocomposing apparatus and method are provided which overcome many of the defects of prior art devices, and permit exacting photocomposing which may be repeated with maximum efficiency. The present invention thus provides for photocomposing with a high degree of accuracy and wherein critical operations are performed substantially automatically. The automated apparatus and method disclosed herein are not only commercially practical but also are highly reliable in routine operation by even semiskilled operators.

Broadly stated, the apparatus of the present invention includes (A) means for storing and supplying severed sheets of plastic film; (B) means for dispensing and leveling a liquid photocurable composition on a sheet of plastic film received by a pneumatic gripping conveyor means from said supply; (C) an exposure station including a housing having at one end an actinic light source and at the other end a support adapted to receive thereon a supported liquid photocurable composition which on exposure to actinic light through an image-bearing transparency becomes selectively insolubilized in the exposed portions thereof; (D) a vertically disposed posterior photocuring station in association with a conveyor means for transferring photoexposed sheets from the support horizontally disposed past the said posterior photocuring station; (E) an etching bath energized by ultrasonic energy in association with transfer means for receiving a plate to be etched; (F) a washing bath for subsequently cleaning a plate after said etching bath with associated plate transfer means; (G) an air-drying station disposed adjacent the washing bath for drying a plate received from said washing bath by said transfer means; and (H) a horizontally disposed posterior photocuring station for finally curing the processed plates, said horizontally disposed photocuring station desirably including conveyor means for transfer of a plate during final photocuring to a receiving station. A platform adapted to receive thereon a photocurable composition dispensed by a regulated dispenser is layered thereon in a substantially uniform thickness. Upon exposure of the photocurable composition to actinic light projected through an image-bearing transparency, it becomes selectively insolubilized in the exposed portions thereof and remains substantially liquid in the nonexposed portions thereof. A transparency film holder is included having a substantially flat face adjacent to the image-bearing transparency which is supported thereagainst. The composition may be received from a continuously recirculating supply to maintain uniformity in the consistency of the liquid photocurable composition.

The method of the present invention generally provides, for photocomposing, the steps of transferring a sheet of plastic material from a supply to a station where a photocurable composition is applied and layered to a substantially uniform thickness, positioning a mounted transparency in a predetermined position over the substantially uniform thickness of liquid photocurable composition at a subsequent station and exposing the liquid photocurable composition to actinic radiation projected through the image-bearing transparency to selectively photocure the liquid composition in image-bearing areas with the nonexposed composition portions remaining substantially liquid and removable as desired. The liquid photocurable composition is applied to the support surface by a substantially automated applicator which includes means for applying a liquid photocurable composition to the support surface and means for leveling the applied composition such to provide a substantially uniform thickness of composition over the support surface. An air blower for directing heated air against the applied liquid photocurable composition may be included to further facilitate the leveling operation and to provide a layer of composition substantially free of any air bubbles which may be entrapped by the composition such as during application to the support surface. In one embodiment of the present method, the liquid photocurable composition is recycled to retain a substantially uniform supply and the supply is maintained at a constant temperature, and under vacuum to remove any gases which may become entrapped therein.

After the composition becomes selectively insolubilized in the exposed portions thereof and remains substantially liquid in the nonexposed portions thereof, the lamination may be defined as including a support surface desirably transparent, over which is disposed a selectively photocured composition portion and a supported uncured liquid composition portion. Because it is recognized that some graduation in photocuring may occur during the selective photocuring step, the lamination is posterior photocured for a controlled period of time by passing vertically and in exposing relationship past a vertically disposed posterior photocuring means. The lamination is thus posterior photocured for a shutter-controlled period of time to actinic light. After the initial controlled posterior photocuring step, the lamination may be defined as comprising a support layer over which is positioned a photocured layer of photocurable composition, over which layer is supported a network of an uncured liquid layer of photocurable compositions and a selectively photocured composition. The exposed surface of the photocurable composition layer may include one portion, i.e., that remaining liquid which may be termed a solubilized portion and a second, i.e., that photocured may be termed an insolubilized portion of the surface. The unexposed liquid or solubilized portion of the photocurable composition layer may be removed by an ultrasonic etching means. After removal of the unexposed liquid portions, the lamination may be washed in a spray of water, dried in a current of heated air and further exposed to actinic light in a horizontally disposed post photocuring unit to further posterior photocure the remaining selectively photocured composition to more permanently harden, detackify, and stabilize any portions thereof which may remain partially unphotocured in situ.

The apparatus of the present invention generally includes an etching bath energized by ultrasonic energy, a water spray bath for cleaning the etched printing plate, and an air dryer for drying the water washed printing plate. Desirably, the etching bath contains a solvent or aqueous detergent solution and a system therefor which continuously monitors the concentration of the solvent or detergent in the etching bath and as required, replenishes depleted solvent or detergent thereby maintaining a desired, substantially constant bath concentration.

Although it is recognized that the apparatus and method of the present invention may be used to prepare numerous products of photocurable compositions, this invention will be hereinafter described with regard to the graphic arts and in particular to preparation of a printing plate of a photocurable liquid composition.

The present plates may include relief images of uniform printing height suitable for either direct or indirect use as a printing plate. Printing plates may be thus prepared rapidly and at uniform relief by applying a layer of a liquid photocurable composition to one surface of a solid flexible support having a thickness of about 2 to about 50 mils and being in a substantially flat position, adjusting the thickness of the photocurable composition to obtain a substantially uniform thickness in the range of about 3 to about 250 mils, on said support surface, exposing the photocurable composition to actinic radiation through an image bearing, line or halftone, positive or negative transparency consisting solely of opaque and substantially transparent areas wherein the opaque areas are substantially of the same optical density, said transparency being maintained substantially parallel to the layer of the composition and desirably with an airgap therebetween of about 1 to about 100 mils until substantially complete solidification of the liquid composition takes place in the exposed areas and essentially no solidification takes place in the unexposed areas, if required, exposing the photocurable composition to actinic radiation to photocure a substantially uniform layer thereof adjacent the support surface when transparent, and thereafter removing the liquid photocurable composition in the unexposed areas. Desirably, the unexposed areas are removed by means of an aqueous or solvent bath and the bath may be energized by ultrasonic energy to an ultrasonic energy level in the range of about 18 to about 40 kilocycles/sec. After the uncured portion of the lamination has been removed, the remaining insolubilized photocured composition is desirably exposed to actinic light in the post or second posterior photocuring elements to insure substantially total photocuring of the composition for more permanently hardening, stabilizing or detackifying the layer of photocured composition for avoiding any fracture in the lamination due to weak portions of the composition which may be hardened by additional photocuring on further exposure to actinic radiation.

One photocurable system which is suitable for use herein is that set out in a copending application having U.S. Ser. No. 674,773 filed Oct. 12, 1967, assigned to the same assignee hereof and incorporated by reference herein. In said photocurable system a printing plate is formed from a layer of a photocurable polymeric composition consisting of a polyene containing at least two unsaturated carbon to carbon bonds per molecule, a polythiol containing two or more thiol groups per molecule and a photosensitizer.

To obtain the maximum strength, solvent resistance, creep resistance, heat resistance and freedom from tackiness, the reaction components consisting of the polyenes and polythiols are formulated in such a manner as to give solid, cross-linked, three dimensional network polythioether polymer systems on curing. In order to achieve such infinite network formation, the individual polyenes and polythiols must each have a functionality of at least 2 and the sum of the functionalities of the polyene and polythiol components must always be greater than 4. Blends and mixtures of the polyenes and the polythiols containing said functionality are also operable herein.

In general, it is preferred, especially at or near the operable lower limits of functionality in the polyene and polythiol, to use the polythiol and the polyene compounds in such amounts that there is one thiol group present for each ene group, it being understood that the total functionality of the system must be greater than 4, and the functionality of the thiol and the diene must each be at least 2. For example, if 2 moles of a triene are used, and a dithiol is used as the curing agent, making the total functionality have a value of 5, it is preferable to use 3 moles of the dithiol. If much less than this amount of the thiol is used, the curing rate will be lower and the product will be weaker in some respects because of the reduced cross-link density. If much more than the stoichiometric amount of the thiol is used, the rate of cure may be higher, if that is desirable, although excessive amounts may lead to a plasticized cross-linked product which may not have the desired properties. However, the relative amounts of polyenes and polythiols may be adjusted to any values above the minimum scope disclosed herein which give desirable properties to the cross-linked polythioether. It must be emphasized that regardless of the ratio of polythiol to polyene, the total functionality of the system must be greater than 4, or a cross-linked network will not result, and the product will be a swellable, chain-extended composition which is unsuitable. Thus, to obtain a solid cross-linked printing plate it is necessary to use a polyene containing at least two reactive unsaturated carbon to carbon bonds per molecule in an amount that the combined functionality of the reactive unsaturated carbon to carbon bonds per molecule and the thiol groups per molecule is greater than 4.

Another composition operable to form a relief printing plate by the process of the instant invention is that set out in British Pat. Nos. 1,102,910 and 1,007,345. Therein the liquid composition consisting of:

(A) 0.001 to 5 percent by weight of a polyboron acid salt of the formula $$M'_2(B_nH_{n-p-q}X_pY_q)_{m'}m \quad (I)$$

wherein $M'$ is a silver (I) or cerium (III) cation, $X$ is halogen; $Y$ is a hydroxyl group, or a hydrocarbyloxyalkoxy or hydrocarbylcarbonyl group free of aliphatic unsaturation and containing at most 12 carbon atoms; $n$ is 10 or 12; $p$ is 1 to 12 and is equal to $n$ minus $q$ when $q$ is greater than zero; $q$ is 0 to 2, $p+q$ being at most equal to $n$; and $m'$ is the valence of $M'$; (when $p$ is greater than 1, the halogens represented by $X$ may be the same or different);

(B) a halide promoter in which the halogen is chlorine, bromine or iodine and which is dissociable by actinic light of wavelength between 2,500 A.; and 7,000 A.; and (C) at least one substance capable of undergoing cationic polymerization is cationically polymerized on exposure to actinic light having a wavelength in the range 2,500 to 7,000 A. Thus, in carrying out the process in the instant invention any liquid photosensitive composition capable of being photopolymerized or photocured or both upon exposure to actinic radiation to a solid polymer is operable to form a relief printing plate.

Another liquid photocurable composition useful to form printing plates is that set out in French Pat. No. 1,471,432. Generally, liquid photosensitive compositions disclosed in this patent comprise as essential constituents, an unsaturated polyester, an ethylenically unsaturated monomer leading itself to a reaction of addition polymerization, and a photosensitizer. The unsaturated polyester may be produced from an alcohol monomer containing at least a polyol comprising at least 5 ether-oxygen radicals linked to carbon atoms in its main chain and not having more than three carbon atoms between the ether-oxygen radicals, and a monomer of acidic character containing at least an unsaturated dicarboxylic acid and/or one of its derivatives.

The liquid photocurable compositions to be converted to printing plates may, if desired, include such additives as antioxidants, accelerators, dyes, inhibitors, activators, fillers, pigments, antistatic agents, flame retardant agents, thickeners, thixotropic agents, surface active agents, light-scattering agents, viscosity modifiers, extending oils, plasticizers, detackifiers and the like. Such additives are usually preblended with the monomer or compound to be photopolymerized or with the polyene or polythiol prior to or during the compounding step. Operable fillers include natural and synthetic resins, carbon black, glass fibers, wood flour, clay, silica, alumina, carbonates, oxides, hydroxides, silicates, glass flakes, glass beads, borates, phosphates, diatomaceous earth, talc, kaolin, barium sulfate, calcium sulfate, calcium carbonate, antimony oxide and the like. The aforesaid additives may be present in quantities up to 500 parts or more per 100 parts polymer by weight and preferably about 0.005 to about 300 parts on the same basis. Each additive must be present in an amount which will not interfere with or inhibit the necessary photocuring or photopolymerization image-producing reaction or other required steps in the plate-making process.

The support to which the photosensitive composition is adhered may be formed from various materials such as rubber, plastic, paper, and the like. The support is preferably a plastic having the characteristics of being flexible, adherable to the photosensitive composition on exposure to actinic radiation or by other means and capable of transmitting a substantial amount of the radiation therethrough. The thickness of the support is dependent on its relative strength and dimensional stability to hold a specified thickness of the photosensitive composition and may be empirically determined by one skilled in the art. For example, when an oriented polyethylene terephthalate in film form sold under the trade name "Mylar" is employed as the support and a 20 mil relief is desired, the "-Mylar" film will have a thickness of about 1 to 10 mils.

The photocurable reaction may be initiated by actinic radiation from special light sources which emit significant amounts of actinic light suitably in the wavelength range of 2,500–7,000 A. For liquid photocurable compositions it is preferred that the light emanate from a point source or in the form of parallel rays. However, divergent beams are also operable under certain circumstances as a source of actinic light. Thus it is possible merely to expose the liquid photocurable composition to actinic radiation, preferably in the range 3,000–4,000 A., under ambient conditions or otherwise and obtain a solid elastomeric or resinous product useful as a printing plate material after development.

Various light sources may be used to obtain sufficient UV light as desired. Such sources include but are not limited to, carbon arcs, mercury arcs, fluorescent lamps with special ultraviolet light-emitting phosphors, xenon arcs, argon glow lamps and photographic flood lamps. Of these, the mercury vapor arcs, particularly the sun lamp type and the xenon arcs are very useful. The sun lamp mercury vapor arcs are customarily used at a distance of about 7 to 10 inches from the liquid composition, whereas the xenon arc is placed at a distance of about 24 to 40 inches from the liquid layer. With a more uniform extended source of low-intrinsic brilliance, such as a group of contiguous fluorescent lamps with special phosphors, the liquid photocurable composition may be exposed within an inch of the lamp. The lamp to plate distance is found to depend upon several variable including light intensity, collimation of rays and the like.

It is important to select the correct exposure time in employing the apparatus of the instant invention. That is, in making printing plates, it is essential that the exposure be sufficient to harden the photocurable composition in the exposed image areas without causing hardening in the nonimage areas. Aside from the exposure time and the light intensity, the extent of the exposure is dependent on the thickness of the liquid layer, the temperature, the presence of light-absorbing pigments or dyes in the liquid composition and the character of the image to be reproduced. In general, the thicker the layer of the liquid composition the longer the exposure time. It has been observed that hardening starts at the surface of the liquid layer closest to the light source and proceeds downward to the support. With insufficient exposure, the layer may have a hard surface but, through lack of a clear through hardening the relief will be removed when the unexposed area is removed in development. When the hardening rate increases at higher temperatures, less exposure may be required thereat than at room temperature. However, care must be exercised that too high a temperature is not obtained during exposure to an actinic light, as this leads to, in some cases, thermal expansion of the liquid composition which results in image distortion. It is preferred that the actinic light radiation be carried out at a temperature in the range of 20°–70° C. Due to the number of variables which affect exposure time, optimum results are best obtained by trial and error with characterization after each exposure. The actinic light may be applied to the liquid composition for periods ranging from 1 second to 20 minutes. Printing plates from liquid compositions may also be prepared by the instant apparatus by projecting the actinic light through a suitable lens system. The employment of a spacer between the liquid composition layer and the image-bearing transparency facilitates removal of the hardened photocured composition from the image-bearing transparency after it has been exposed to actinic light. The spacers are merely employed to maintain an airgap between the liquid photosensitive composition and the image-bearing transparency and said airgap can range from 0.1 to 250 mils or more.

The solvent employed for developing the relief image of the printing plate made from the liquid composition is primarily a diluent which reduces the viscosity of the unexposed liquid composition so that it is easily removed. The liquid is selected so that it is readily miscible with or emulsified with the unexposed liquid composition yet has little action on the exposed hardened image or the support layer. The liquid employed for washing will depend on the liquid composition and includes, but is not limited to water, water and a detergent and/or soap, mixtures of alcohols, e.g., methanol and/or ethanol with or without ethyl, methyl, or propyl acetate. Other solvents with high-evaporation rates are well known to those skilled in the art. It should be noted herein that the term "solvent" includes not only organic solvents but also water and other aqueous systems wherein the unexposed liquid composition is soluble (including dispersible) in said systems and the exposed liquid portion is not so affected. In those instances where the liquid composition is acidic or basic, the printing relief may be developed by dissolving or dispersing the unexposed areas in an aqueous system of the opposite polarity, i.e., to use an aqueous acidic solvent system with a basic liquid composition and vice versa.

Practice of the present invention will become more apparent from the following detailed description taken in connection with the accompanying drawings wherein like numerals refer to similar elements throughout the several views.

FIG. 1 is a front perspective view generally illustrating the apparatus of the present invention;

FIG. 2 diagrammatically illustrates the method and combination of relative locations of stations forming the apparatus of the present invention;

Figure 21:
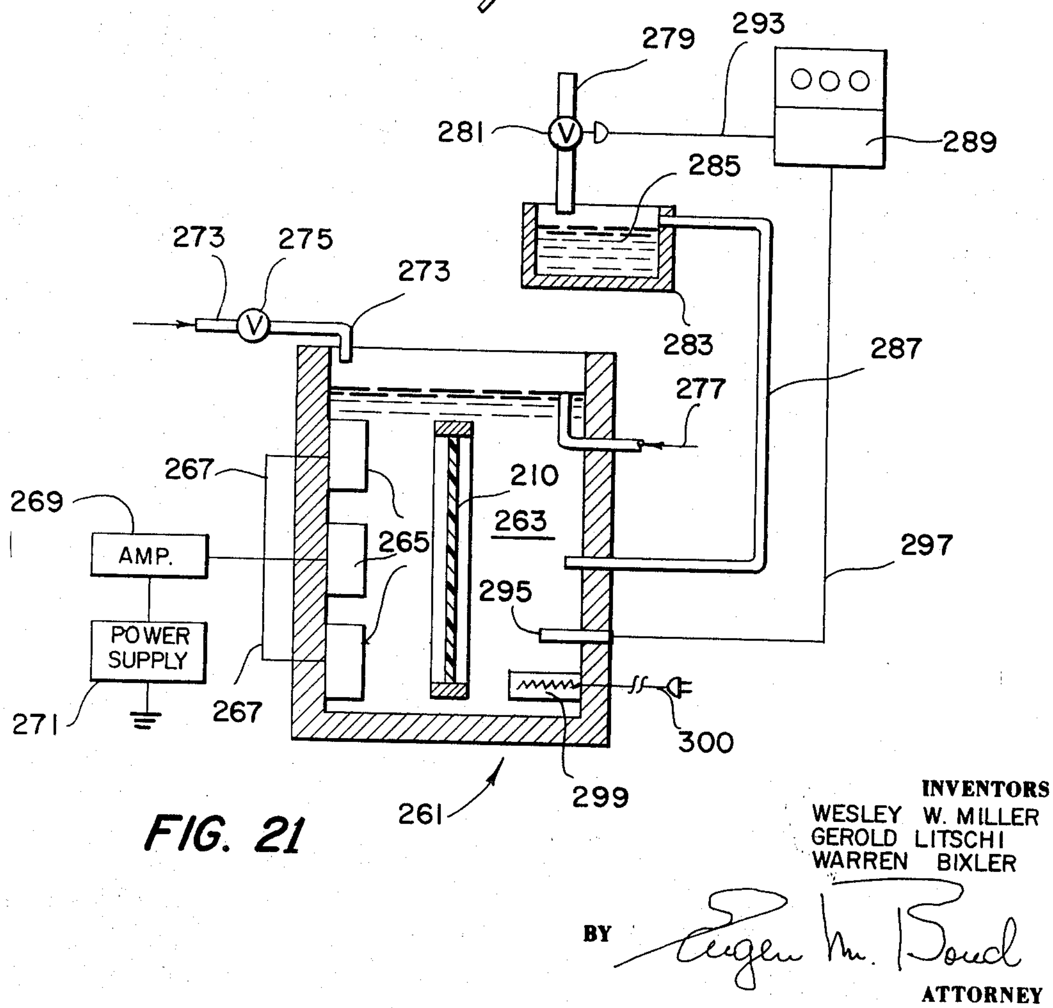
Figure 22:
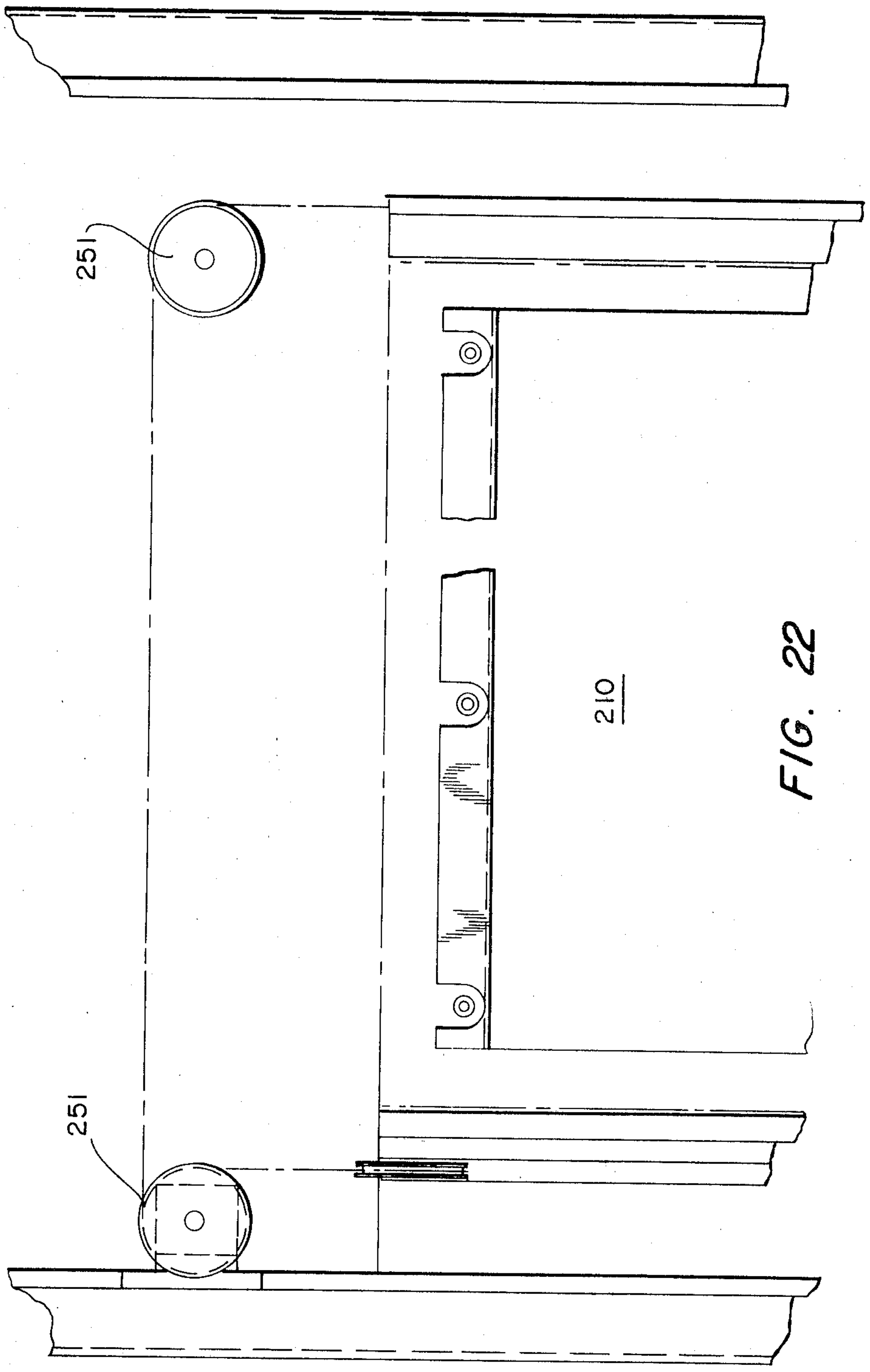
Figure 24:
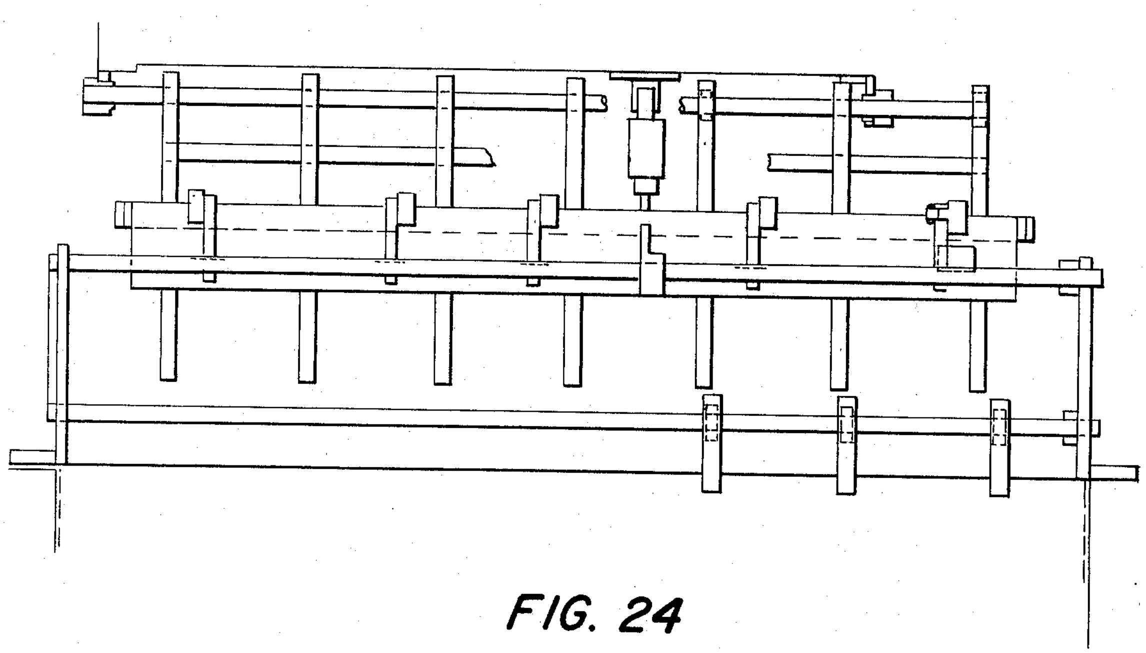
Figure 23:
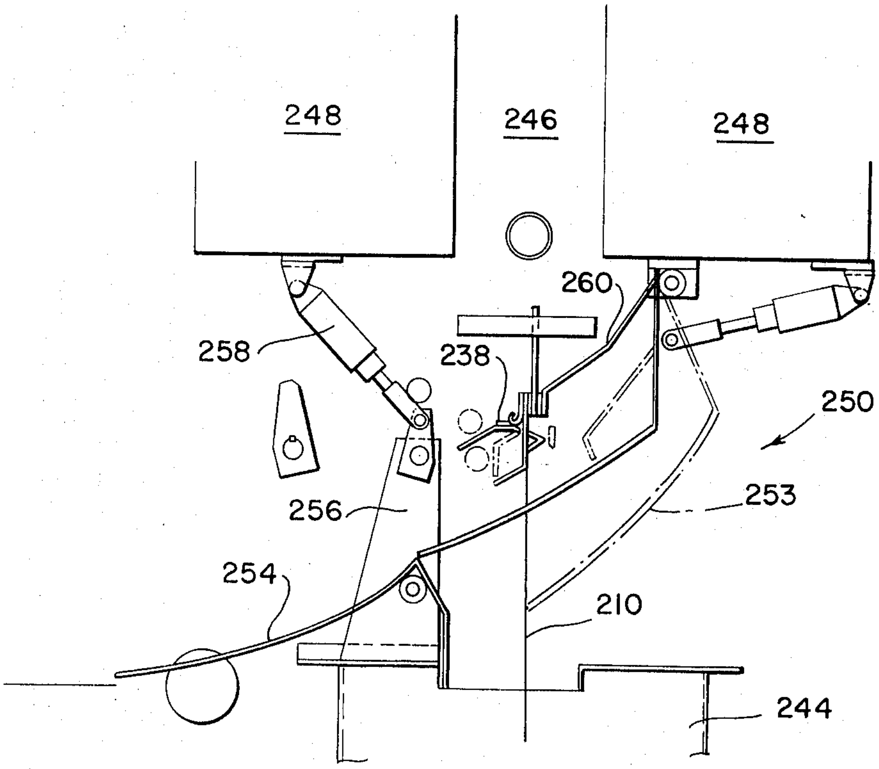
Figure 25:
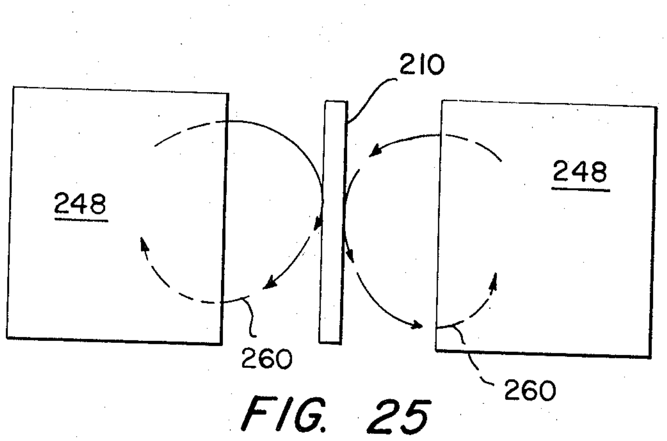
Figure 26:
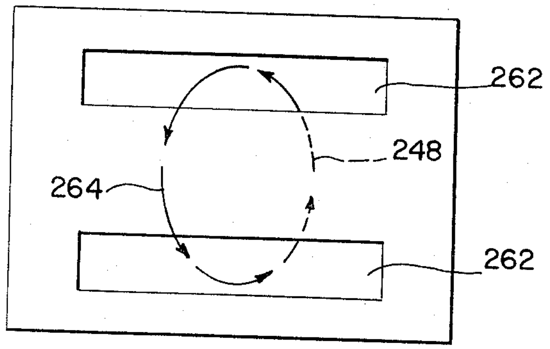
Figure 27:
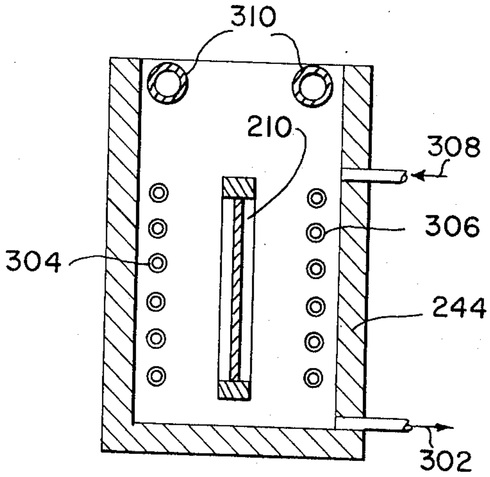
Figure 28:
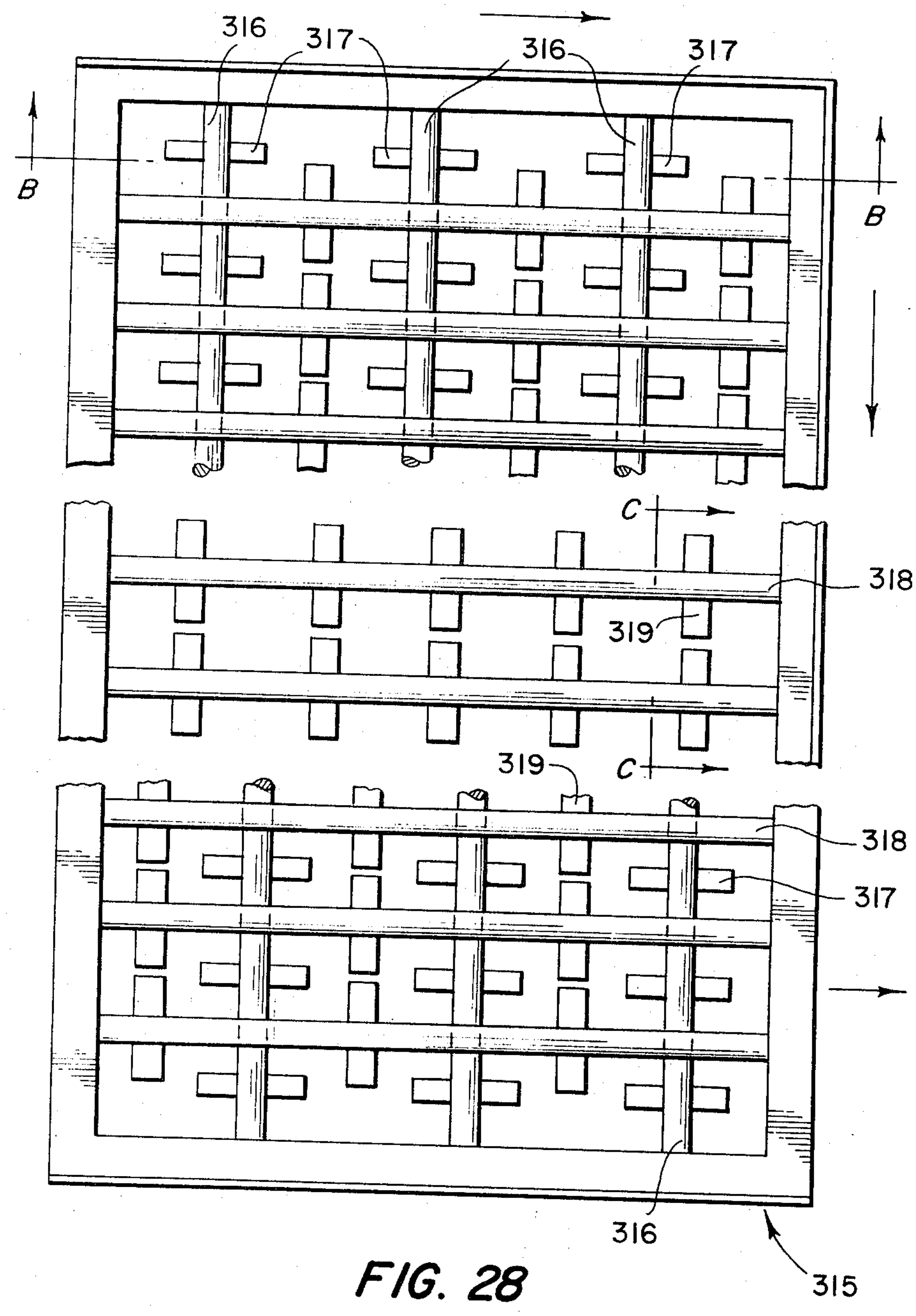
Figure 29:
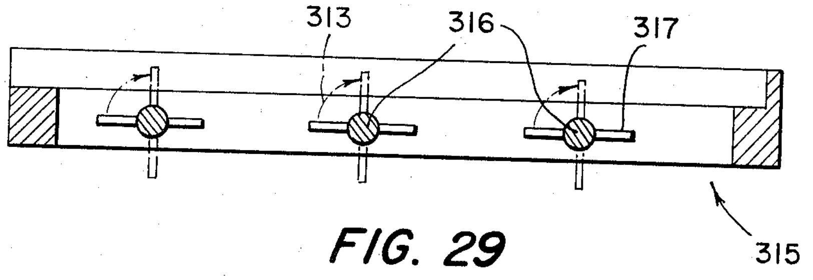
Figure 30:
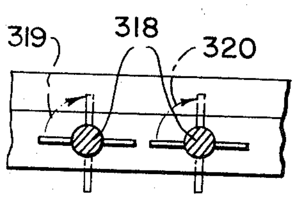
Figure 31:
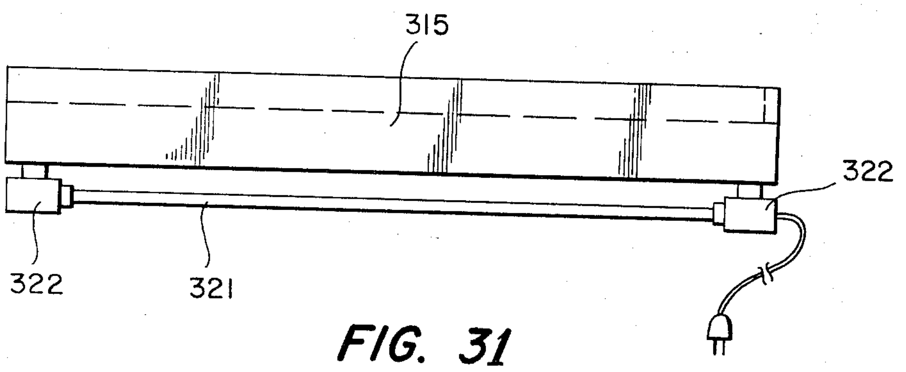

FIG. 21 diagrammatically illustrates an etching bath energized by means of ultrasonic energy and having a system associated therewith which continuously monitors the bath concentration and replenishes depleted solvent or detergent as required;

FIG. 22 illustrates a partial side elevational view of a vertical plate transfer mechanism;

FIG. 23 illustrates as a side elevational view the relative association of washing, drying, and plate slide transfer mechanisms;

FIG. 24 illustrates as a partial top elevational view the plate slide transfer mechanism of FIG. 23;

FIG. 25 generally illustrates as a side elevational view the drying mechanism of FIG. 23;

FIG. 26 further illustrates the drying mechanism taken as a sectional view along lines A—A of FIG. 25;

FIG. 27 diagrammatically illustrates a water spray bath for cleaning etched printing plates;

FIG. 28 is a top elevational view taken in sections of a posterior photocuring transfer mechanism for finally curing the processed plate;

FIG. 29 is a partial side elevational view of the mechanism of FIG. 28 taken along section lines B—B thereof;

FIG. 30 is a partial side elevational view of the mechanism of FIG. 28 taken along section lines C—C thereof; and FIG. 31 is a side elevational view diagrammatically illustrating the relative positioning of posterior photocuring lights and the mechanism of FIG. 28.

Figure 1:
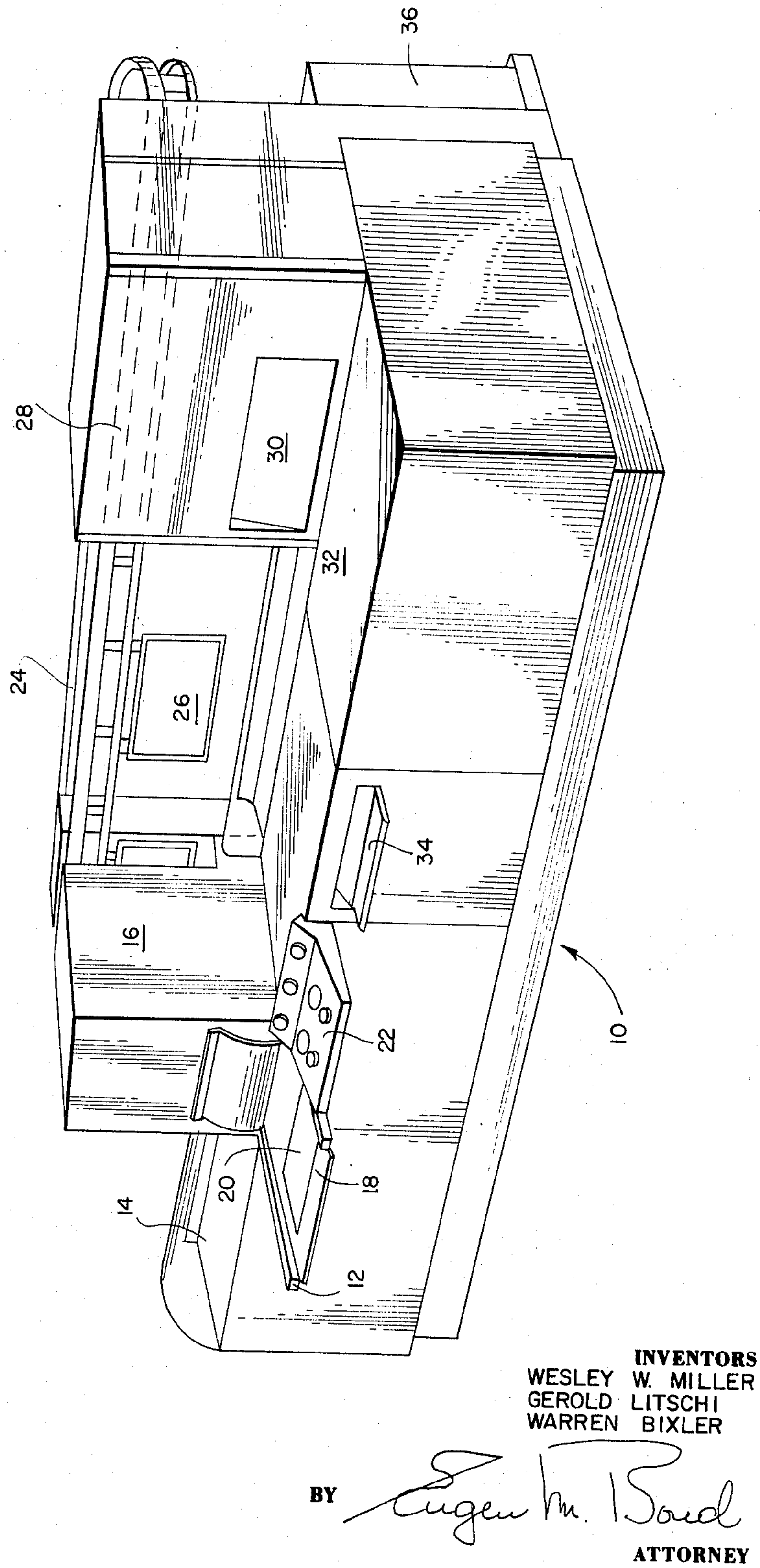

Referring to the drawings wherein similar elements are referred to by similar numerals throughout the several views, FIG. 1 illustrates photocomposing apparatus 10 including a station 12 generally illustrated and enclosing by shell 14 a supply of support sheets, not shown, and a photocurable liquid-dispensing station described hereafter. Apparatus 10 further includes an upper compartment 16 wherein is disposed an actinic light source and means 18 for mounting a transparency film 20 to be photoduplicated. Apparatus 10 may further include a control panel 22.

Conveyor 24 is included for transferring plates 26 from exposure unit 16 for further processing as subsequently described into an etching bath followed by further processing within chamber 28 enclosing a water wash mechanism and air dryer wet plate slide 30 which transfers dried plates to within housed chamber 32 for final curing and transfer ultimately to plate-dispensing platform 34. Control means 36 are also included as required.

Figure 2:
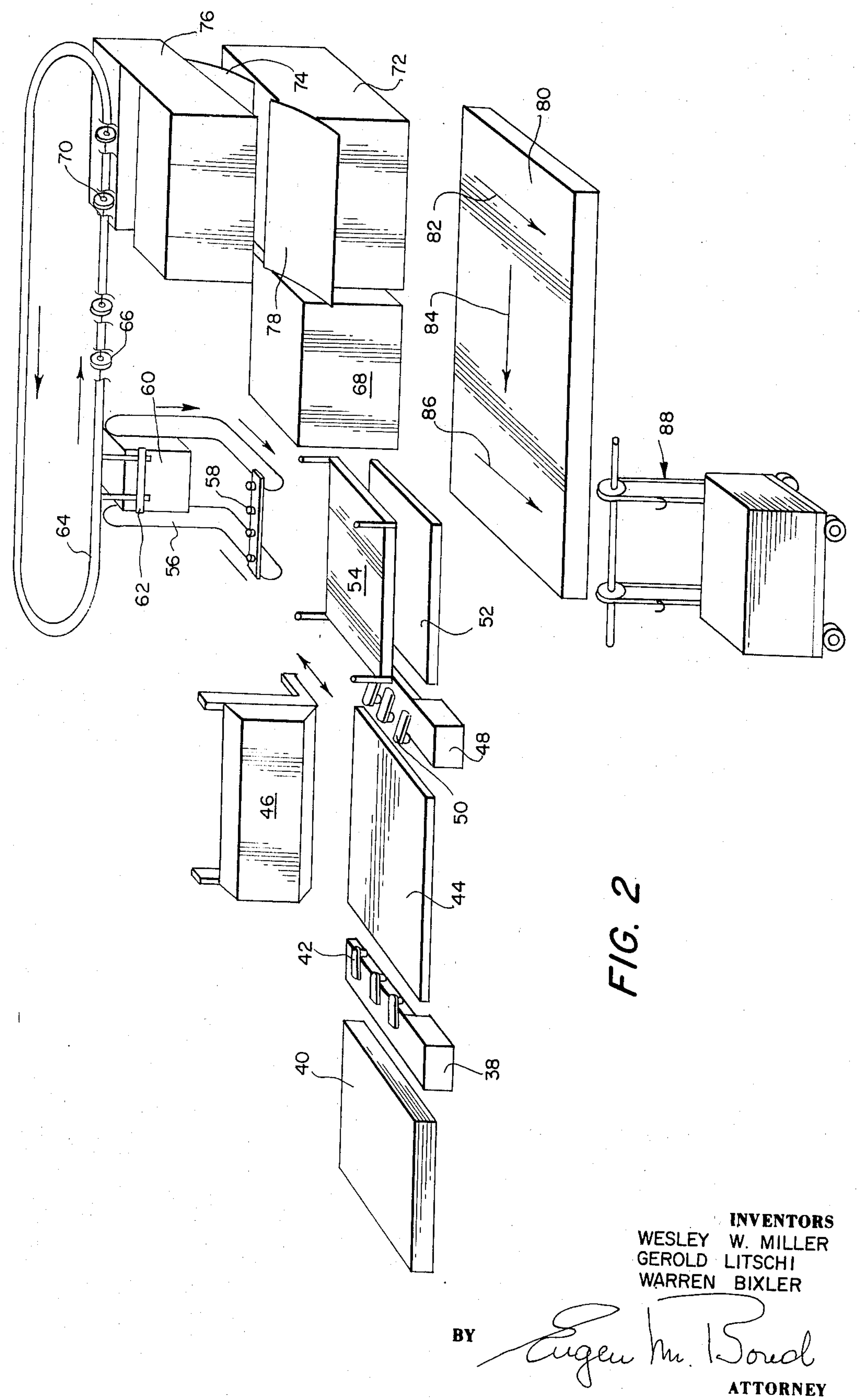

FIG. 2 diagrammatically illustrates the method and apparatus of the present invention. A pneumatic sheet conveyor mechanism 38 transfers a sheet from stack 40 by suction nozzles 42 to platen 44 whereon a sheet is maintained substantially flat by vacuum as described hereafter. Dispenser mechanism 46 is included for dispensing a photocurable composition to the surface of a sheet disposed on platen 44 followed by leveling of the dispensed composition. Thereafter, transfer mechanism 48 removes sheet from platen 44 by vacuum nozzles 50 and releases the sheet on exposure platform 52. Transparency supporting plate 54 is then positioned over platform 52 and exposure is effected by using an actinic light source located within a hemispherical reflector to direct the rays of light through plate 54 to selectively photocure the composition on platform 52.

After exposure, the sheet is transferred from platform 52 by transfer mechanism 56 including a vacuum gripping means 58 for lifting the exposed plate from platform 52 in a vertical direction past posterior photoexposing unit 60 to hanger 62 supported along track 64. The exposed plate from station 60 is transferred to location 66 from which the plate may be lowered into an ultrasonic etching bath 68. Following etching, the plate is returned to location 66 and transferred to location 70 on track 64. The etched plate is then lowered into wash tank 72 when plate slide 74 is removed from interfering position. After the plate has been washed with a spray of water or the like, it is elevated to dryer 76 and after drying is dropped by gravity onto slide 74 now in position for conveying sheet onto continuation slide 78 and onto transfer table 80. The plate is initially transferred in direction of arrow 82 and after being firmly positioned on transfer mechanism 80 is transferred in the direction of arrow 84 by means described in detail hereafter. Disposed beneath transfer mechanism 80 is a series of posterior photocuring lights which finally cure the plate while traveling in the direction of arrow 84. Upon final curing, the plate is transferred in the direction of arrow 86 to a plate receiving unit 88 illustrated as a mobile rack which transfers plates to a printing press or the like as may be required.

Figure 3:
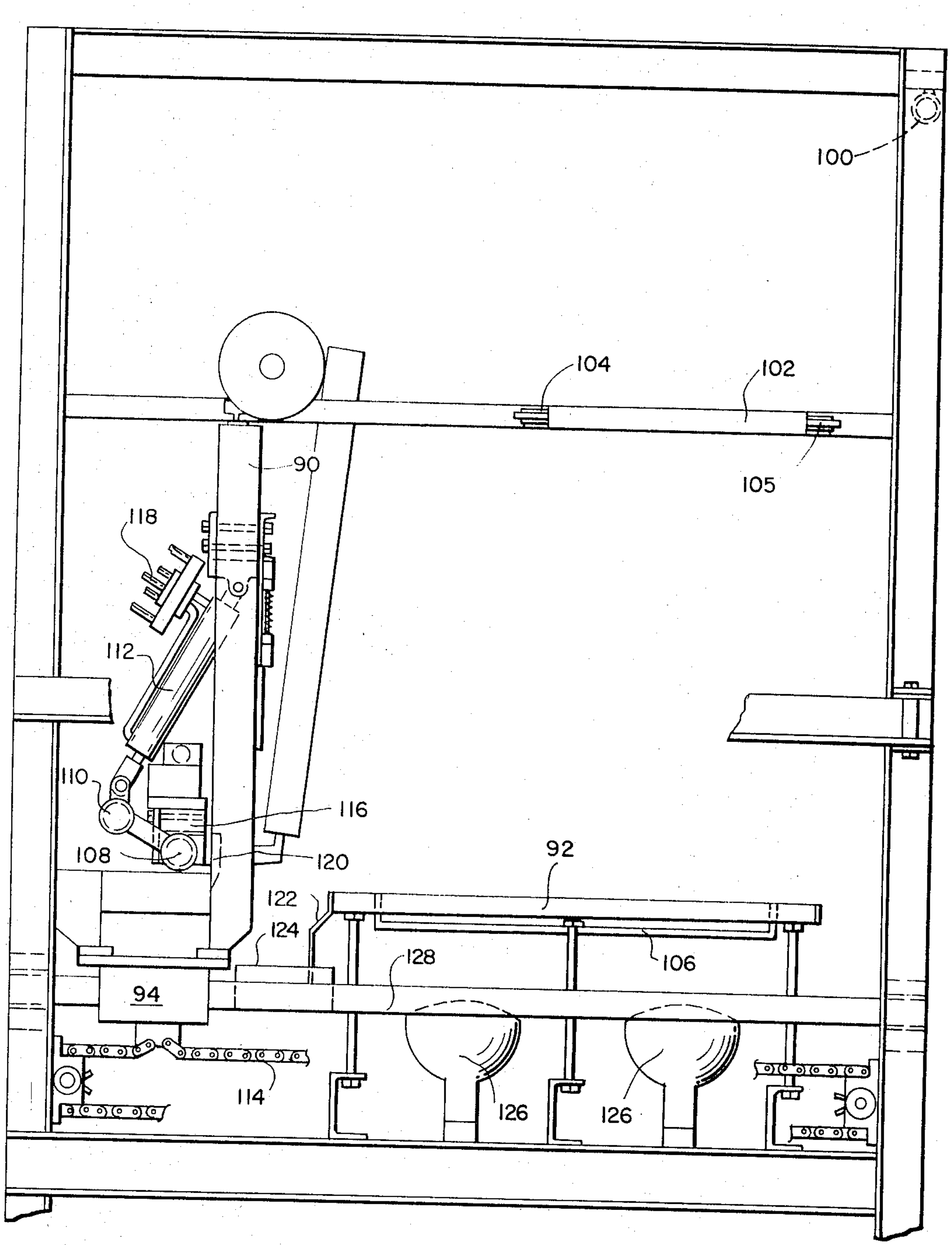
FIG. 3 is a partial side elevational view illustrating the position of elements for dispensing and leveling of the dispensed liquid photocurable composition.
Figure 4:
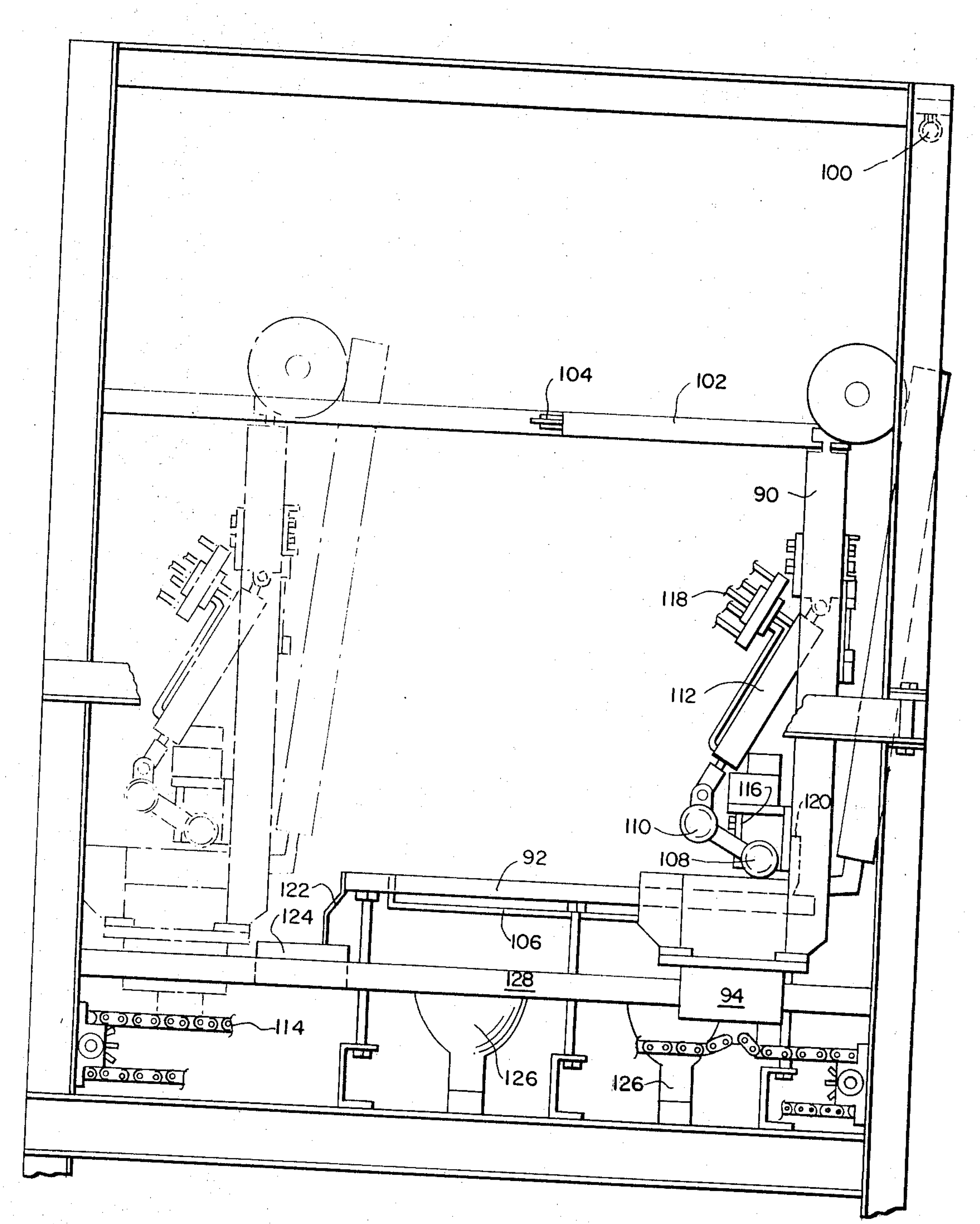
FIG. 4 is a partial side elevational view illustrating the position of the elements subsequent to dispensing and preparatory to leveling of the dispensed liquid photocurable composition.
Figure 6:
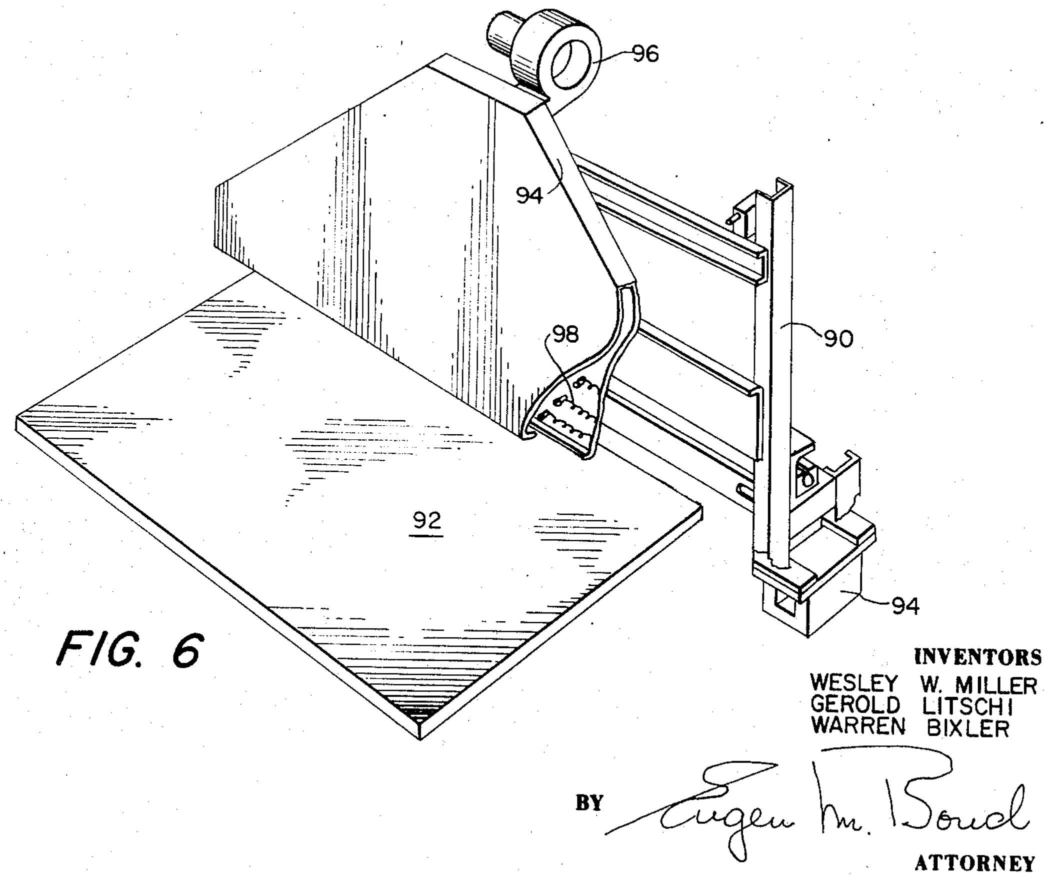
FIG. 6 illustrates as a perspective view, a carriage including a platen or support surface and in association with an air unit.

FIGS. 3, 4, and 6 illustrate the various elements associated with carriage 90 in position relative to surface layer 92. Rail block 94 may support carriage 90 and may usefully position the carriage relative to the surface layer 92. In addition carriage 90 may include chamber 94 for receiving air generated by blower 96 and for passing same over heating elements 98 prior to being directed against a dispensed liquid photocurable composition on surface layer 92 for limiting formation of voids caused by entrapped air or gas bubbles.

The dispensing leveling mechanism may include bar 100 for generating ions to eliminate any static electricity that may accumulate within the compartment. A static electricity eliminator usefully employed is one of the types which generates ions flowing on a stream of air. Examples of useful ion generators include static electricity eliminators generally referred to as aerostat units such as those manufactured by Testane Electronics of Flour Town, Pennsylvania.

Disposed on framing elements 102 may appear switch 104 either for starting or stopping dispensing of the liquid photocurable composition or for starting or stopping generation of a heated stream of air projected against the dispensed liquid composition on the surface layer of platen 92.

Desirably, a vacuum transport 106 is included to retain a thin support film against platen 92 over when the dispensed liquid photocurable composition may be received from dispenser tubing 108.

In the liquid composition dispensing system, tubing 110 may be pivoted about dispensing tubing 108 by piston 112 attached to the upper section of carriage 90 as illustrated. In the nondispensing position, liquid composition may be recycled through line 110 and returned to the supply as will be subsequently indicated.

Vacuum table 92 may be heated by heating elements 112 illustrated as infrared heating lamps for maintaining a desired temperature on the surface layer thereof and to prevent congealing of the liquid composition thereon. The heating elements may be regulated such to provide a substantially constant temperature on the surface layer or vacuum table 92.

Sprocket chain 114 may be included for positioning rail mount 94 for movement of the carriage as will be more clearly apparent hereafter.

The sequence of operation of the dispensing leveling mechanism is more fully illustrated in FIGS. 3–4. In FIG. 3 there is illustrated a first position.

The liquid composition dispensing system includes liquid dispenser 108 in nondispensing position in mounting 116 relative to recycle tubing 110 which may be pivotally moved about dispenser tubing 108 by piston 112 activated by air received through tubing manifold 118. Doctor blade 120 is included adjacent the liquid dispensing system for leveling dispensed composition as will be indicated subsequently.

In association with surface layer or vacuum table 94 having vacuum line 106 therewith, is guide 122 to trough 124 for receiving excess composition removed after application by doctor blade 120. The doctor blade traverses the dispensed liquid composition and removes overflow excess composition to the trough 124. Heating lamps 126 may be desirably included for maintaining a surface temperature to vacuum table 106 for optimum spreading and leveling of the liquid composition and for preventing congealing of the composition thereon.

Sprocket chain 114 is illustrated attached to rail block 94 for positioning along rail 128 relative to table 92. Along frame network 102 is switch 104 and switch 105 for starting and stopping the operation of the liquid dispensing system as well as for starting and stopping the air-blowing system.

From the normal starting position of FIG. 3, the carriage may be moved to the right as indicated in FIG. 4 with movement being effected by a variable speed motor connected in operating relationship with sprocket chain 114 for moving rail block 94 along rail 128. As an element of carriage 90 contacts switch 104, piston 112 is actuated and tubing 110 is pivoted about dispensing tubing 108 thus opening the slots or dispensing nozzles for dispensing liquid composition onto surface layer 92. As the carriage continues movement to the right from the phantom position illustrated, dispensing is continued along the surface layer in a substantially constant fashion.

After the carriage has moved to switch 105, it occupies a general position illustrated in FIG. 4 and at which point dispensing is terminated by piston 112 which returns by pivotal movement tubing 110 about tubing 108 within clamp 116. At this point, the movement of rail block 94 along rail 128 is also terminated.

After the liquid dispensing has terminated, the motor-driven sprocket chain 114 is reversed for movement of the carriage 94 back to normal position. Upon the return movement, switch 105 actuates air blower 96 when included which directs a stream of air into housing 94 wherein it is heated and directed over the dispensed liquid composition on the surface layer. As the carriage is returned to normal position, the doctor blade 120, preceding the air unit, levels the applied liquid composition to a substantially uniform layer over the vacuum table 92. Following the leveling as carriage 90 moves to the left to phantom position, heated air is directed against the leveled composition to remove surface bubbles which may appear therein and thus provides a substantially level and consistent layer of liquid composition having substantially unblemished surface characteristics.

As the carriage moves past switch 104, the generation of air by blower 96 is terminated electrically and the carriage proceeds to normal position indicated in FIG. 3.

After the carriage has been returned to the normal position indicated in FIG. 3, the plate is now ready for the exposure step.

Figure 5:
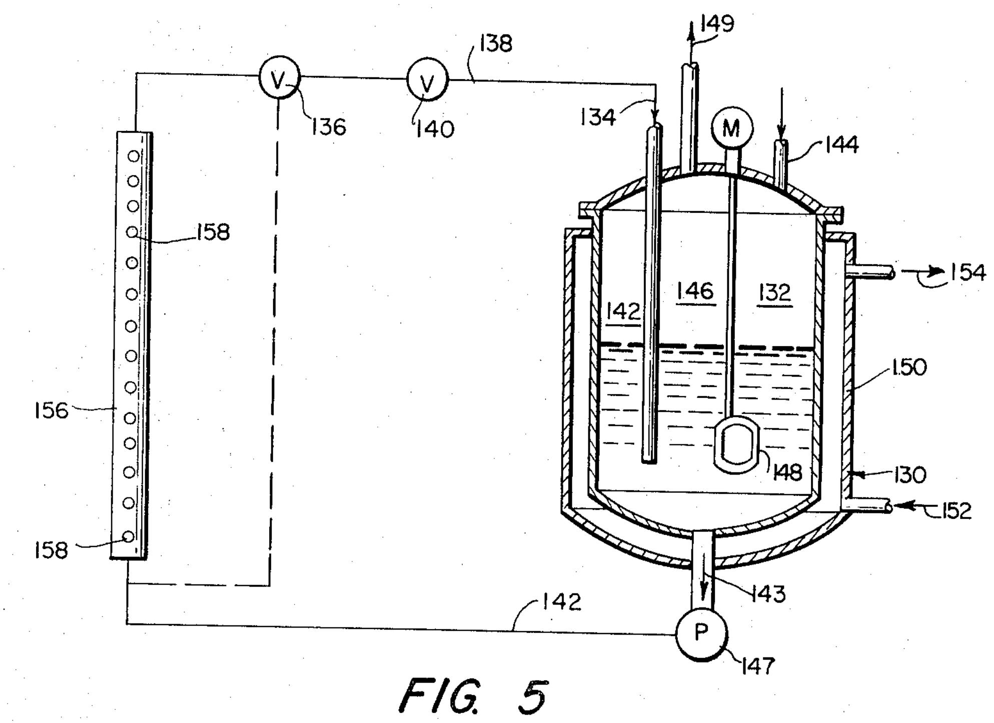
FIG. 5 illustrates as a general diagram the liquid photocurable composition system.

FIG. 5 illustrates the liquid photocurable composition system for use in association with the elements described relative to FIG. 3. The system of FIG. 5 includes a composition storage tank 130 having storage compartment 132 into which may flow, as indicated by direction arrow 134 a liquid photocurable composition. Suitable valve 136 such as one operated by a solenoid electrical arrangement may be included in line 138 and may be further complemented, if desired, by manual valve 140. The liquid composition is received into the storage tank through line 142 and may be resupplied from time to time through a suitable port 144 to make up the amount of liquid composition dispensed. Stirrer 146 may be also included having stirring elements 148 for continuously agitating the stored liquid photocurable composition to maintain a substantially uniform composition as well as for removing any entrapped air or gas in the composition. In order to further limit entrapment of air, vacuum may be maintained through line 149 or otherwise as desired to remove any air or gases from the liquid system.

To further limit entrapment of air or gas bubbles within the liquid composition and to further provide a liquid system which readily flows through the elements of the system, jacketed heater 150 may be included about chamber 132 for maintaining the stored photocurable composition at a temperature such that the composition is readily fluid. Heat may be supplied within jacketed chamber 150 by a heat transfer fluid including water received through lines 152 and 154 from a suitable heat source with heat developed by electricity, gas, a simple heat transfer system receiving heat from another source or the like as may be desired.

Liquid photocurable composition within chamber 132 may be transferred to dispensing line 142 in the direction of arrow 143 by pump 147. Desirably, pump 147 is a positive displacement pump to further limit entrapment of air within the photocurable composition and provide a constant pressure in the system for dispensing.

Pump 147 is generally shown receiving liquid photocurable composition from within chamber 132 and passing same through line 142 to dispenser 156 having a series of dispensing slots or nozzles 158 positioned thereon. During the dispensing operation, the liquid composition is received through line 142 and passes into dispenser 158. During the nondispensing periods, liquid composition may be received in line 142 and passed through nondispensing path 160 when valve 136 is closed to terminate dispensing. The liquid composition thus passes through dispenser 156 and returns to line 138 where the flow rate may be regulated by valve 140 as desired for controlling the recycle flow rate. The liquid composition is received through line 138 and returns into chamber 132 by passing down into the liquid thus limiting the opportunity for entrapment of gases or air within the liquid composition on its return to the storage area. The composition may be agitated by stirring rod 146 and stirrer 148 operated by any suitable motor 160 or related means. Vacuum may be maintained within the system by line 149 receiving vacuum generated from a suitable means conventionally known to the art.

The liquid composition may be added to the storage tank through line 144 from time to time as may be necessary to maintain a supply of liquid composition in the system. Although not illustrated, it is recognized that line 144 is closed during operation periods to retain vacuum in the system.

Figures 7, 8:
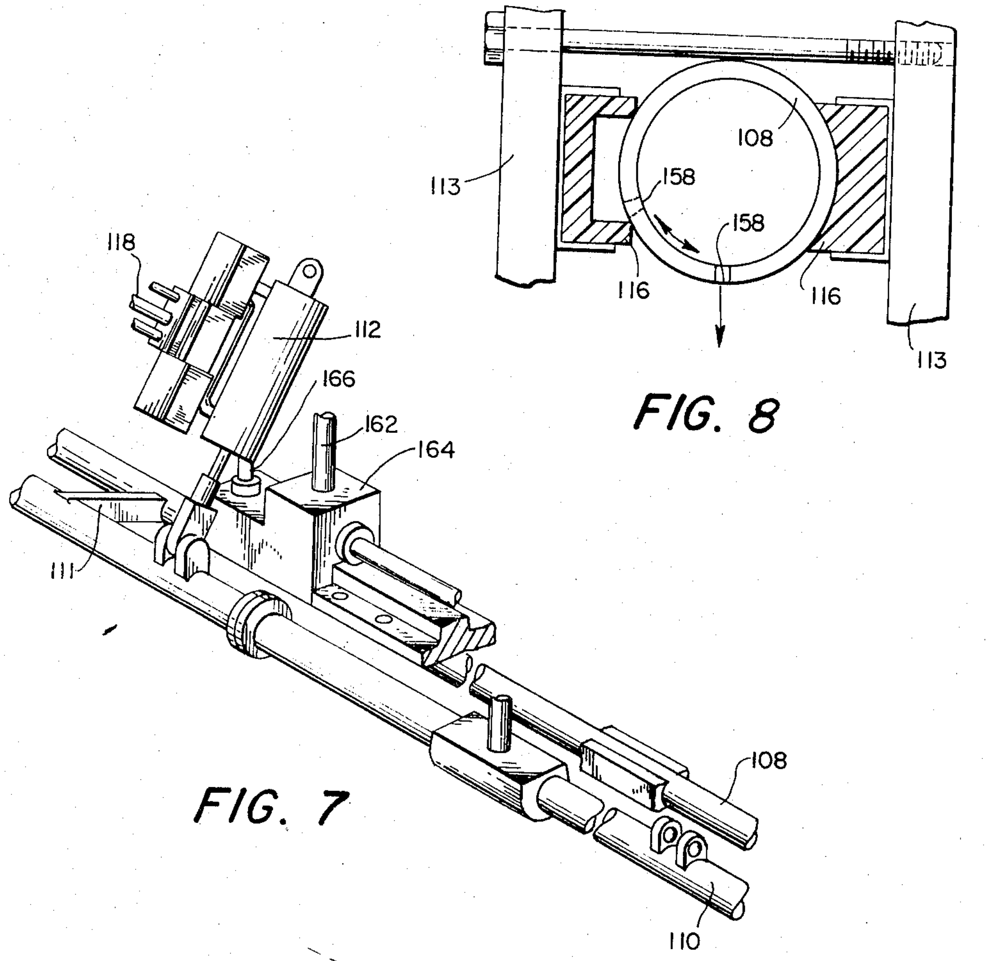
FIG. 7 shows as a partial perspective view a liquid photocurable composition dispenser means.
FIG. 8 shows further as a partial side elevational view a liquid photocurable composition dispenser.

FIG. 7 illustrates the dispensing element which may include air cylinder 112 receiving air through manifold tubing system 118 which may also serve to provide either air or vacuum for additional elements associated with the apparatus. Cylinder 112 which may be supported by the apparatus is used to rotate tubing 110 relative to the tubing 108 for dispensing liquid composition when dispensing ports are rotated from closed position within housing 116. Rotation of tubing 110 relative to tubing 108 may be effected through a joining bar 111 such as is illustrated.

Liquid composition may be received in line 162 to housing 164 for passage to line 108 for dispensing or for recirculation through line 110. If desired, heating element 166 may be included to maintain the fluidity of the liquid composition to prevent premature congealing thereof.

FIG. 8 further illustrates a means by which dispensing may be accomplished. Tubing 108 having a multiple number of dispensing slots or ports 158 positioned there along may be in closed position as illustrated within dispenser housing 116. Dispensing housing may be formed of any material which will prevent leakage but preferably is formed of a long-wearing material such as nylon, Teflon or the like. Dispensing may be accomplished upon rotation as indicated by the direction arrow to dispensing position or to substantially vertical position over the support surface. Other means for dispensing may also be devised if desired. The dispenser housing 116 may be maintained relative to dispenser tubing 108 by support elements 113 which may provide any degree of pressure to housing 116 and to tubing 108.

Figure 9:
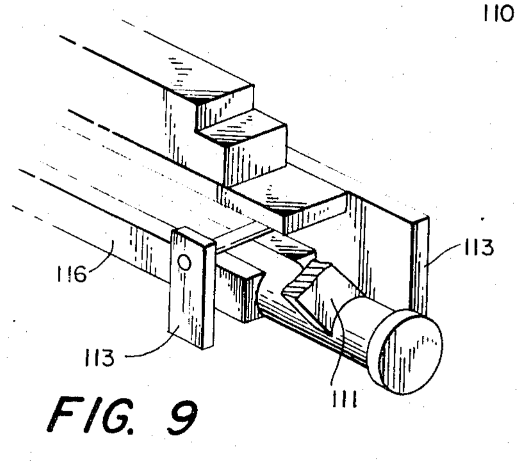
FIG. 9 shows as a partial end perspective view a liquid photocurable composition dispenser.

FIG. 9 further illustrates the end section of the dispensing element and includes dispensing housing 116 with dispenser tubing mounted therein and for rotation, there is included bracket 111. Housing 116 may be clamped against tubing 108 by elements 113 as previously indicated.

Figure 10:
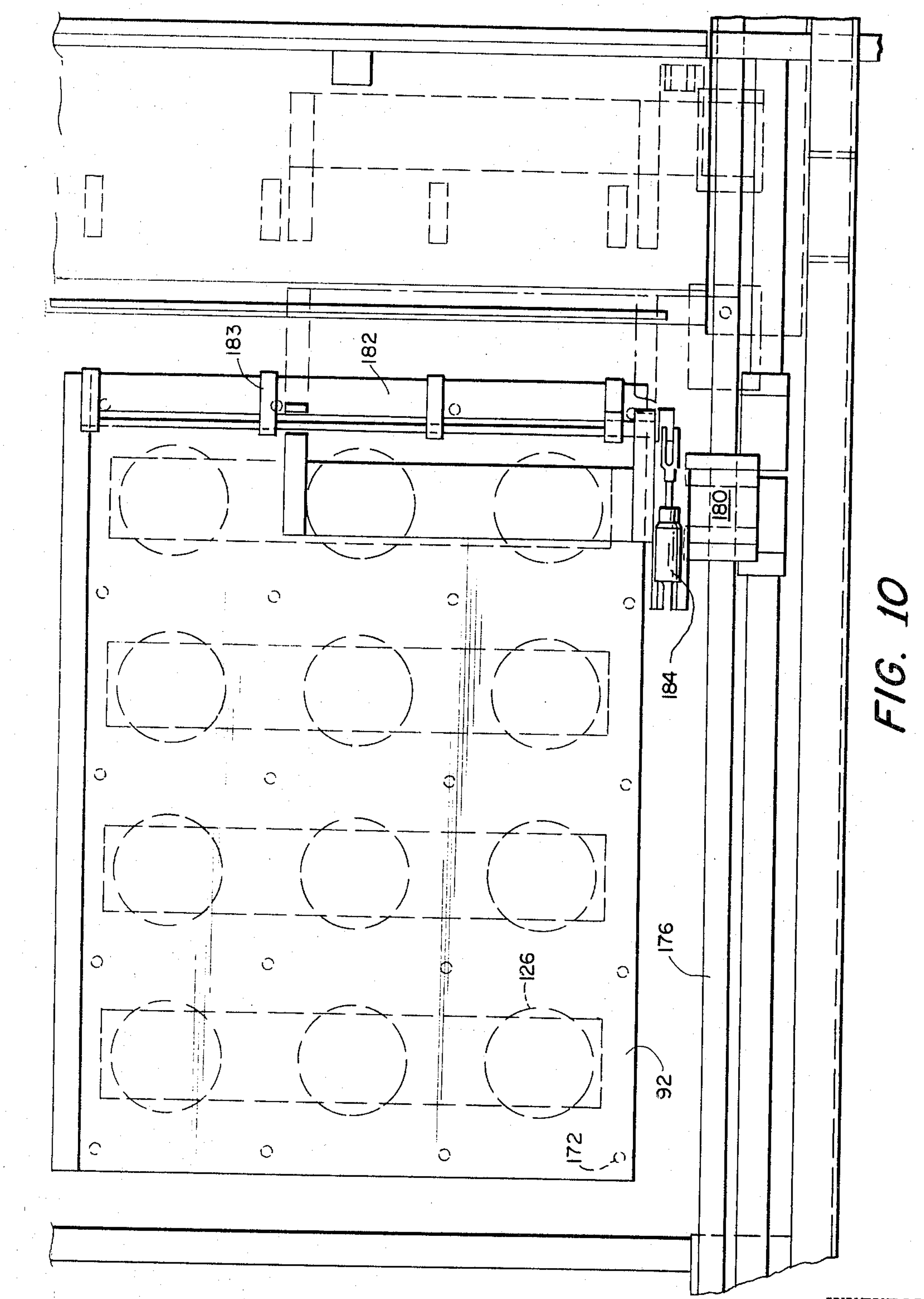
FIG. 10 is a partial top elevational view of a transfer mechanism in association with the platen of FIG. 6.
Figure 11:
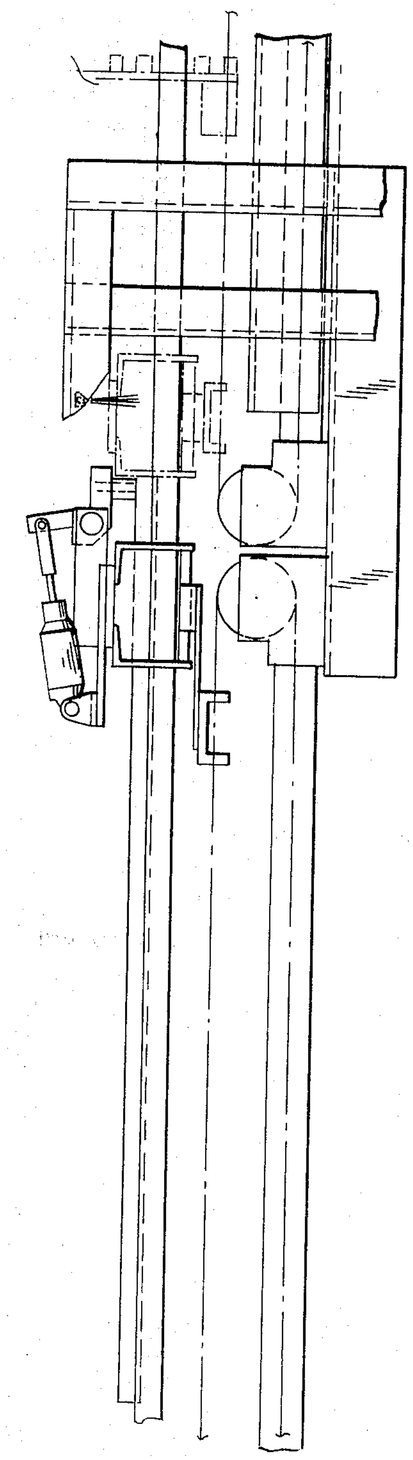
FIG. 11 is a partial side elevational view of the transfer mechanism of FIG. 10.

FIGS. 10–11 illustrates a plate transfer means for positioning the plate over the support surface prior to coating with a photocurable composition. Heating means 128 may be included to retain a substantially uniform surface temperature on the support surface. The transfer mechanism may include bar 182, vacuum-operated nozzles 183 may be pivoted into plate engaging position by cylinder 184. The transfer mechanism may be positioned along rail 176 by block 180 which may be driven by cable 188 through cable attachment 186. Cable 188 may be driven as desired over pulley 190. A related plate transfer drive is illustrated as cable 194 disposed over pulley 192.

Figure 12:
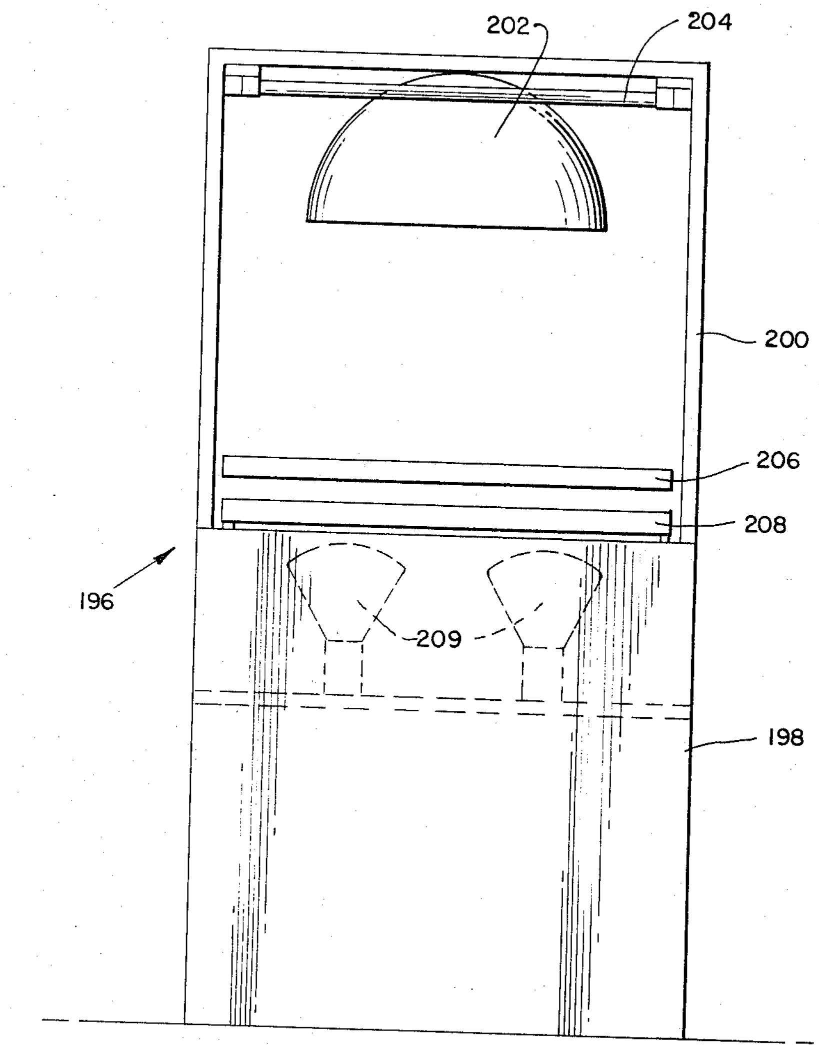
FIG. 12 is a front elevational view further illustrating the photocurable composition deposit station.

FIG. 12 generally illustrates, in simplified fashion, photocomposing station 196 having base compartment 198 and upper compartment 200. Disposed within upper compartment 200 is actinic light source 202 and, if desired, means 204 for generating ions for elimination of electrostatic electricity charges within the upper compartment. The actinic light source is located within a hemispherical reflective unit to direct the rays of light, and is connected to a power source not shown. Disposed near the bottom of compartment 198 is substantially transparent mounting plate 206 for mounting a transparency over a support surface or platen 208. Heating lights 209 may be included within lower compartment 198 to heat plate 208, if desired.

An image-bearing transparency, preferably adhering to a photographic glass plate is positioned with the transparency down in substantially spaced parallel relationship to the surface of the liquid composition. If a spacer is omitted the image-bearing transparency may be placed in direct contact with the surface of the liquid composition or to facilitate removal therefrom a thin layer of a protective film of silicone or other well-known release agent may be applied to the transparency prior to contact with the liquid photosensitive composition.

Numerous means are available for retaining a transparency film such as a photographic negative to the transparent plate. These means include support plates whereon the film is merely layered over a transparent plate, support plates having clamping means to hold the film physically to the plate member, as well as other related means such as lamination of a film between adjoining plates. A transparent plate having a channeled area removed from one surface in combination with vacuum transport means usefully serves to provide a device for retaining a transparency thereover and is preferred for use herein. The transparent plate for mounting a transparency film may include a transparent foundation plate having a channeled section removed from a substantially flat surface thereof and forming a periphery thereon. Vacuum transport means passing through the plate to the removed channeled section may be interconnected to a vacuum source. The transparency film may then be retained by the vacuum in the channeled section to the flat surface of the plate and light may be projected therethrough for exposure of a liquid photocurable composition.

After the transparency is in position, the actinic light is turned on for a period of time to selectively photocure the liquid composition layer.

After the required exposure to actinic light is obtained, the light source is turned off. The vacuum to vacuum table may be shut off and the support with the photocured composition is removed from the apparatus.

Figure 14:
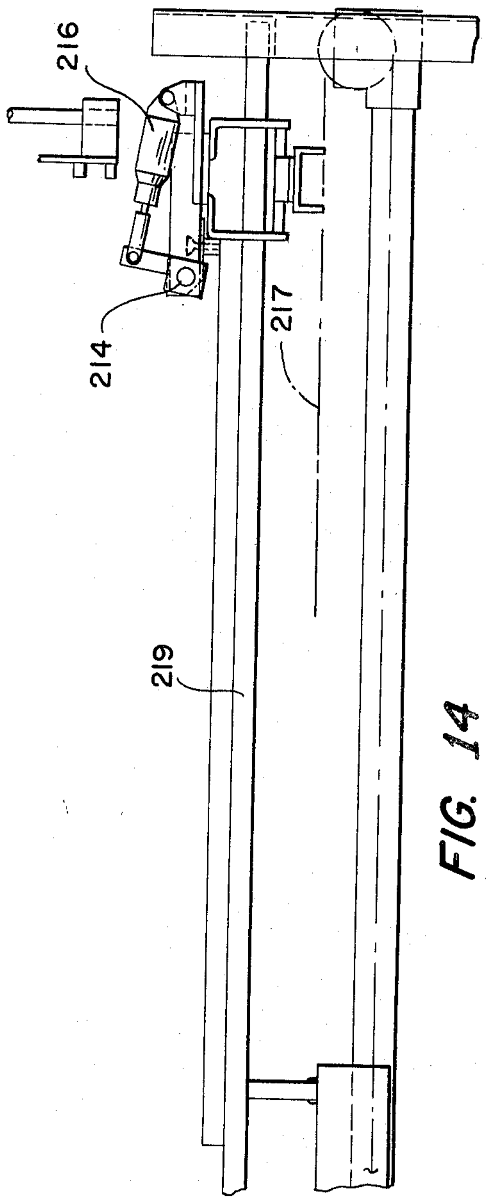
FIG. 14 is a side elevational view of the illustration of FIG. 13.
Figure 13:
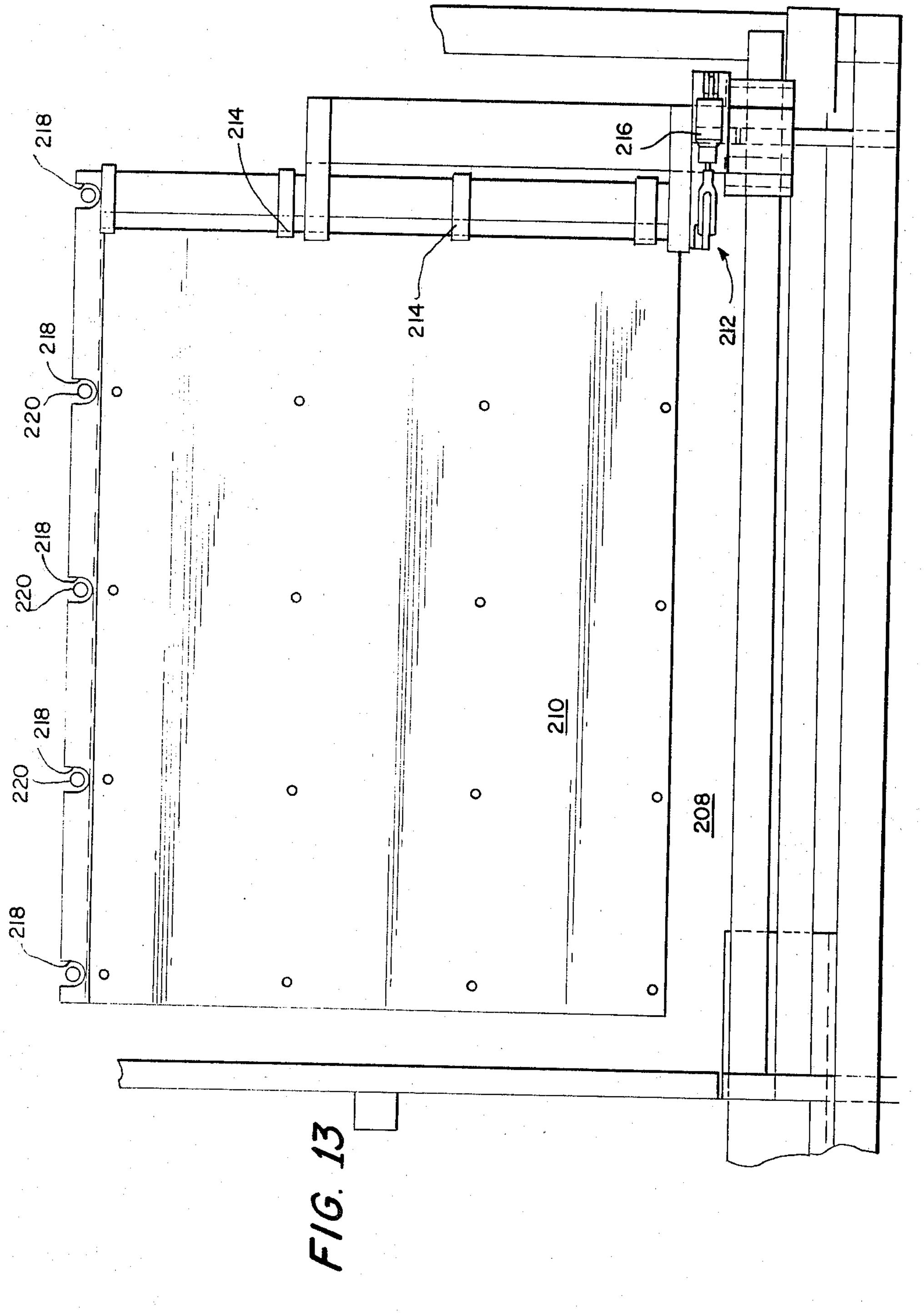
FIG. 13 is a top elevational view of the exposure station platen including in association therewith a horizontal sheet transfer mechanism.

FIG. 13 illustrates how plate 210 may appear after exposure and disposed on platen 208. The plate is transferred initially from photocuring composition dispersing and leveling station by transfer means 212, also illustrated in FIG. 14 and in effect appearing as a mirror image disposed transfer mechanism to that of FIG. 11. Transfer is effected by vacuum gripping by members 214 which are actuated by cylinder 216. The mechanism 212 horizontally slides by cable 217, FIG. 14, along rail 219.

In FIG. 13, plate 210 includes an edge positioned over a series of U-shaped cutouts 218 in support surface 208 such that vacuum-operated transfer nozzles 220 may attach to plate 210 and remove it from the support surface.

Figure 15:
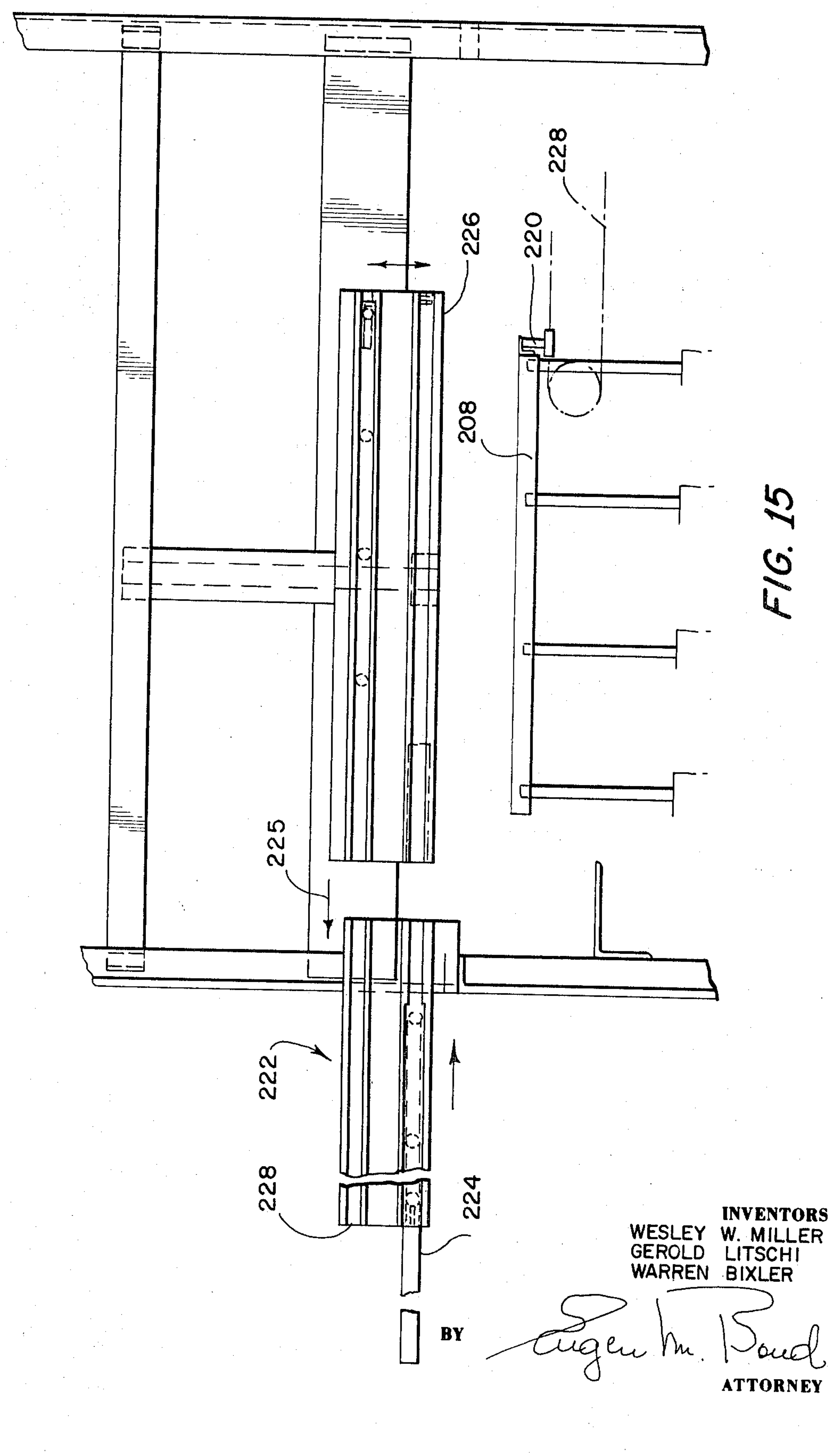
FIG. 15 illustrates a partial side elevational view of a transparency film holder for use in selectively exposing the photocurable composition on the support sheet.

FIG. 15 further illustrates the relative association of elements of the photocomposing or exposure station of FIG. 12. Conveniently, a dual purpose mechanism 222 is included to permit an operator to manually mount a transparency on a plate 224, roller attached, for insertion into receiving station 226. Receiving station 226 may be elevated vertically to any desired position over surface 208. An exposed transparency mounted on a transparent plate may be removed by arrow 225 to location 228 as desired. Other convenient means may also be employed for mounting and transferring transparencies into exposing position.

Figure 16:
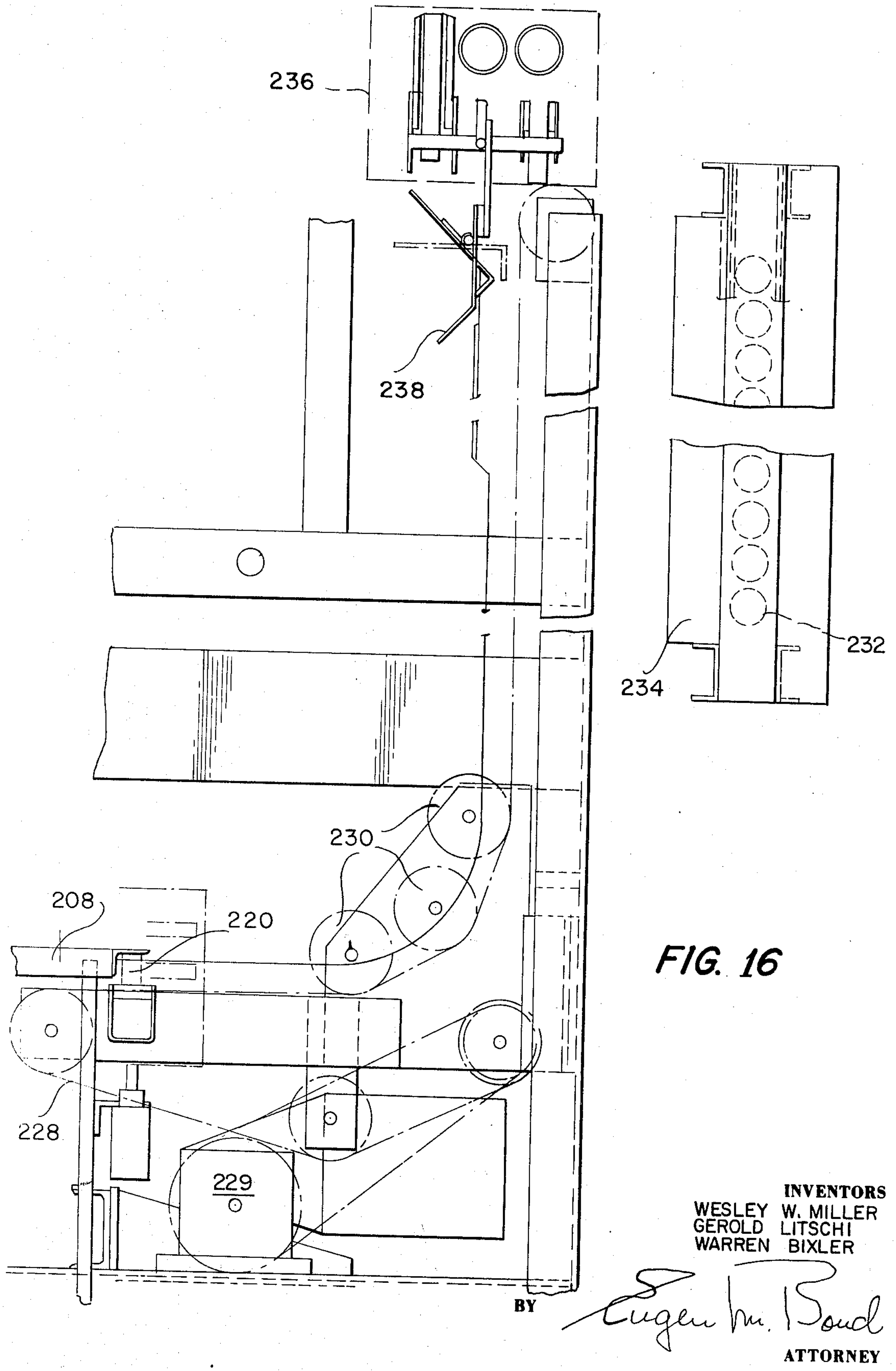
FIG. 16 illustrates a partial side elevational view of a sheet transfer mechanism in association with the exposure platen.

Plates 210, after exposure are next horizontally removed from surface 208 by vacuum-gripping members 220, although it is recognized that other related means may be employed, and then transferred by cable or chain 228 to a vertical transfer as illustrated in greater detail in FIG. 16.

FIG. 16 presents further and in greater detail the transfer of plate 210 from surface 208 by vacuum nozzles 220 on cable means 228. Cable means 228 may be driven by drive complex 229. Nozzles 220 change from horizontal plate transfer direction to vertical plate transfer direction by a series of rolls 230 positioned along the transfer track as illustrated. During the vertical transfer of plate 210, it is posterior photocured by exposure for a precise period of time to actinic lights within a shutter operated housing 234. Ultimately, plate 210 is clamped to rail system 236 by clamp 238 described subsequently.

Figure 17:
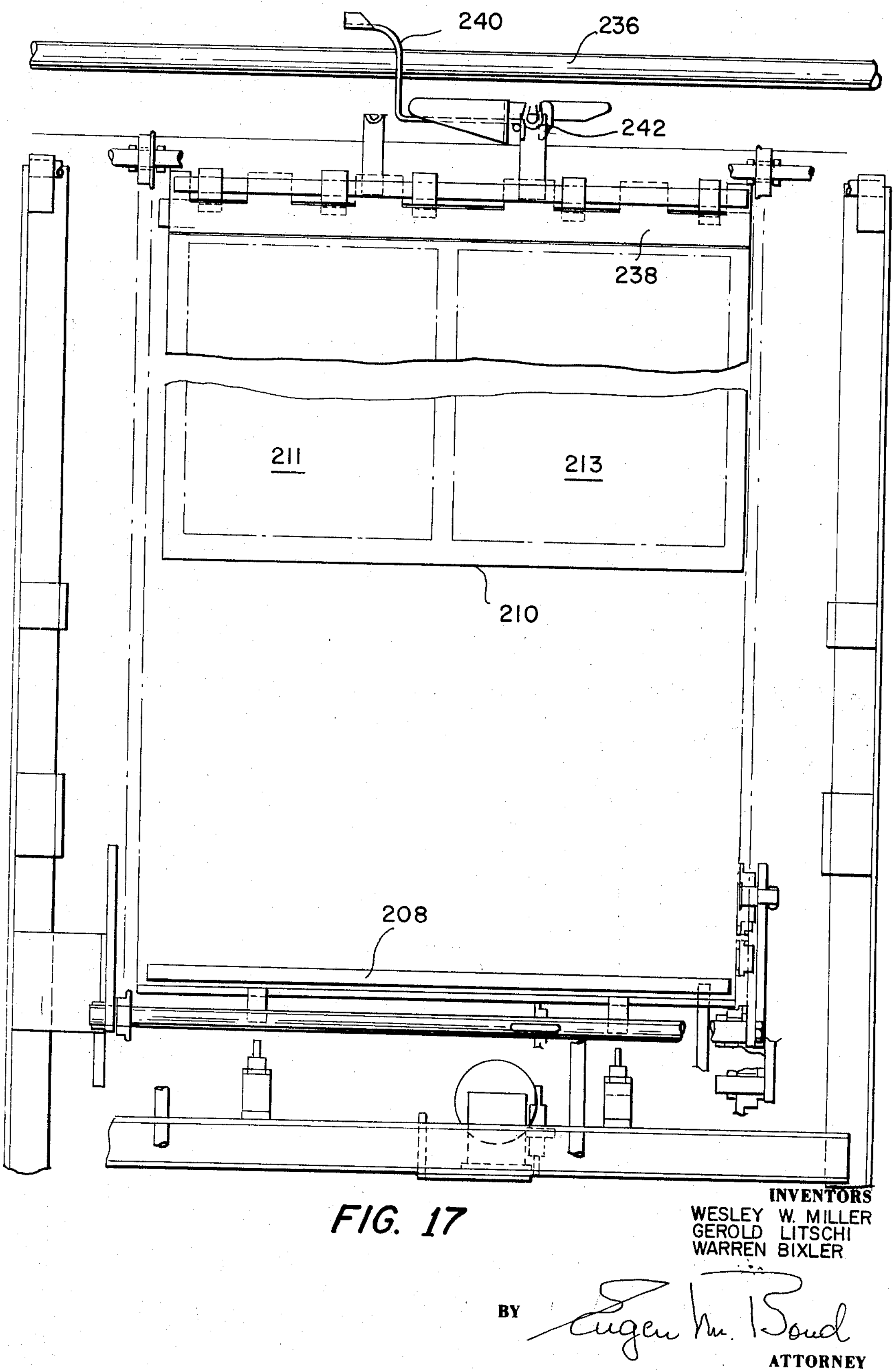
FIG. 17 is a front elevational view of that illustrated in FIG. 16.
Figure 19:
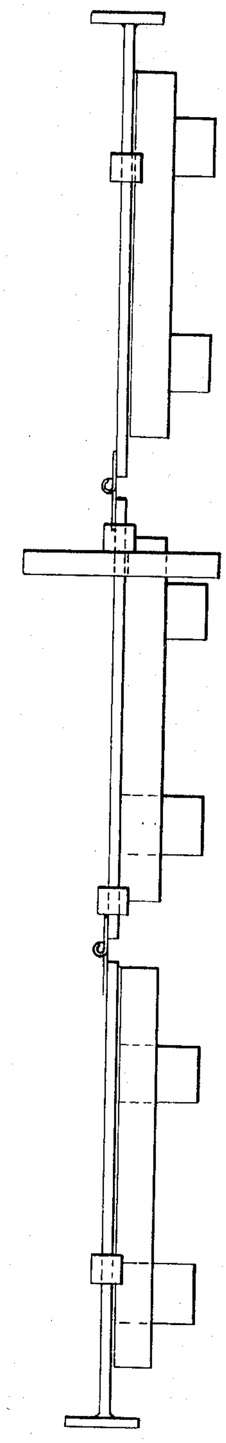
FIG. 19 is a top elevational view of that illustrated in FIG. 18.
Figure 18:
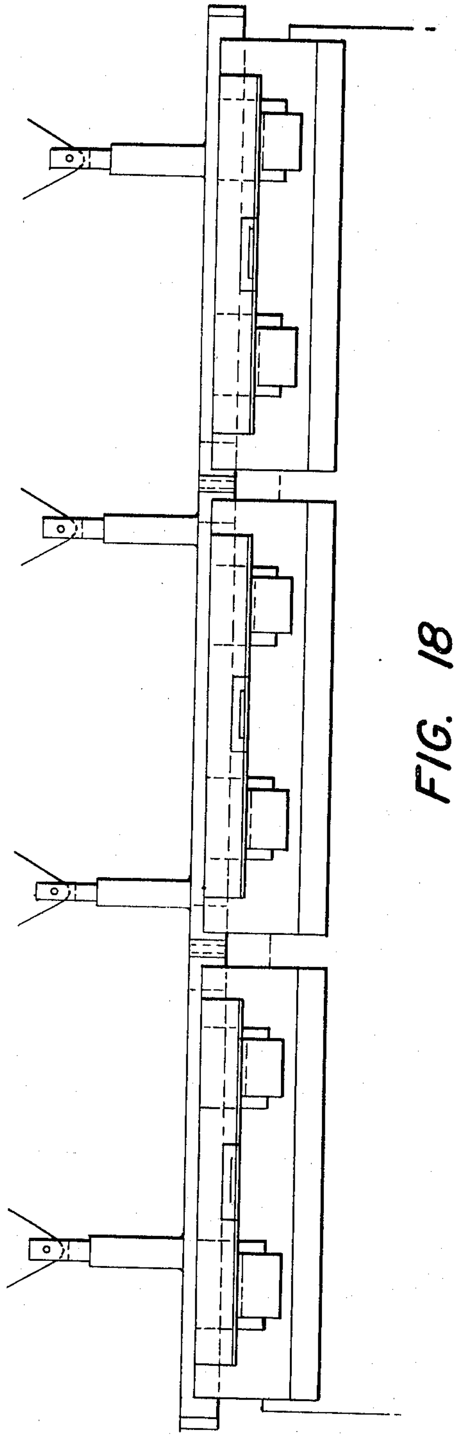
FIG. 18 is a front elevational view of a carriage bar assembly with plate clamp.
Figure 20:
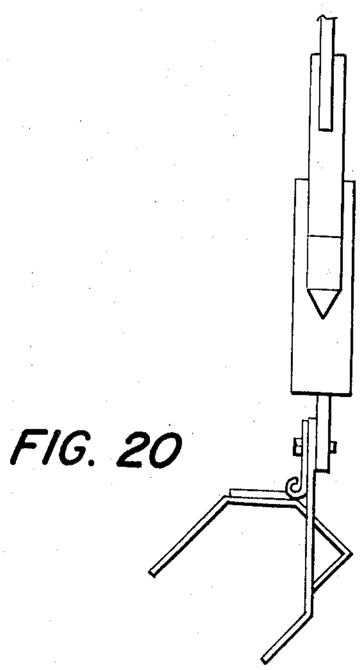
FIG. 20 is a partial side elevational view of the clamp of FIG. 18.

FIG. 17 further presents the general association of elements of FIG. 16 with plate 210 illustrated with a length sufficient to duplicate two pages 211 and 213 respectfully. Lever 240 and members 242 work in association with rail system 236 to horizontally and vertically transfer plate 210 for further processing as described hereafter. FIGS. 18 and 19 further illustrate the rail system of the present apparatus, with FIG. 20 presenting the clamping configuration to receive and secure plate 210 into the rail system with subsequent release upon command at the desired location.

The rail system with associated elements is illustrated, but for simplicity, the mechanism with functional elements is not elaborated upon. These systems are well known and perfected for use in arts remote to that of the present apparatus. One useful mechanism for the present rail system is that referred to as "Chainveyor Power", a trademark to Chainveyor Operations, Hewitt-Robins Incorporated, Division of Litton Industries, Los Angeles, Calif. U.S.A. This system may be described as an overhead conveyor which provides load-switching features. The system employs its standard power line to move carriers from one area to another; the associated "free" system is used for switching and in-process temporary storage. Application of this system affords almost unlimited versatility in fast and slow, stop-and-go production, and can route carriers and loads into and out of preselected processing or storage lines, to and from stations. Independently operating carriers make it possible to dispatch loads to various destinations. Preset devices automatically switch the carrier off at any desired station, returning it to the same power line for transportation to a subsequent station in the system. In stop-and-go operation, a plate may be diverted to a free line for processing while the load is at a standstill; and after processing is completed, the carrier may reenter the power-free system and automatically move to the next station or operation.

When a carrier is disposed at a free or nonpowered station, the plate may be lowered by gravity into the processing unit. A lowering unit for this purpose is generally illustrated in FIG. 22.

FIG. 21 illustrates etching bath tank 261 formed of a suitable material such as a metal for retaining a cleaning liquid or etching solution 263 therein.

Disposed relative to tank 261 and desirably along one sidewall thereof is a means to energize the bath with ultrasonic energy generated by transducers 265 positioned within the solution and receiving through lines 267 electrical energy from amplifier 269 and power supply 271. It is found that more effective etching results by positioning the transducers along the sidewall of bath 261 since more direct cavitation is available and materials are readily removed by currents generated in solution 263. The removed materials may either float to the surface of the solution or may sink to the tank bottom when the plate is substantially vertically disposed therein as illustrated without undue interference with the cavitation of other areas.

The ultrasonic activation of the bath to produce cavitation may be provided by various known methods employing transducers. The transducers most commonly used for ultrasonic cleaning are either magnetostrictive made of nickel, or its alloys or electrostrictive units made of barium titanate and/or lead zirconate.

One method is to place transducers on the sides or bottom of the tank 261 containing the bath solution 263 and connect said transducers to generators to energize same at between about 18 to about 40 kilocycles/sec. and preferably about 20 kilocycles/sec. or more and a power density level nominally in the range of 5–20 watts/sq. in. or more. It is obvious that longer cleaning or etching periods are required at the lower power density level, i.e., of the order of 3–10 minutes and that rapid cleaning of the order of 0.5 to 2 minutes may be obtained at the upper power density level for a newspaper page about 15½×24 inches.

Etching tank 261 may further include in addition to a solution 263, a system therefor which continuously monitors the concentration of the solvent or detergent in the etching bath and as required, replenishes depleted solvent or detergent thereby maintaining a desired, substantially constant bath concentration. One useful system may include pipe 273 having a standard valve 275 receiving water from a convenient source for continuously transporting the water at a fixed constant rate to tank 261. Excess solution in tank 261 may be conveniently removed such as by overflow drain tube 277 if desired.

The system may further include a second pipe 279 receiving water from a convenient source for transporting water at a rate regulated by solenoid controlled valve 281 to detergent tank 283 containing a detergent or solution 285 therein. As water is received in detergent tank 283, a corresponding amount containing detergent or etching solvent is received by overflow line 287 which transports the overflow to solution 263 in etching tank 261. Control 289 is used to regulate the output through solenoid controlled valve 281 by electrical line 293. The concentration of solution 263 may be monitored by electrode 295 in the etching tank which measures the strength of the solution and transmits the signal to control 289 by electrical line 297. If the concentration of the solution is low, power is supplied to the solenoid valve causing it to open and admit water into the detergent reservoir. The concentration of the solution contained in the reservoir is caused to overflow into the etching tank, thus building up the solution strength. When the strength of the solution attains the proper level, the solenoid valve is closed until the strength of the solution again falls below the predetermined level at which the solenoid valve is again opened to correct the depletion.

If desired, heater 299 receiving electrical energy through line 300 may be included in etching tank 261 to maintain the temperature of the solution 263 at a temperature whereat the unexposed area of a photocurable or photopolymerizable composition is in the liquid or molten phase. Bath temperatures may range from room temperature up to the boiling point of water at atmospheric pressure and even higher if a pressurized system is maintained. A preferred temperature is in the range of about 150° to about 200° F.

It has been found that using an aqueous solution of detergent and soap in combination with ultrasonic activation of bath 263 to impart cavitation thereto, the etching time may be reduced and the relief obtained is far superior in topographical quality and in fidelity of image reproduction.

For the aforementioned photocurable system, the preferred bath is an aqueous bath containing a suitable, commercially available inorganic or organic detergent in an amount ranging from about 0.05 to about 30 percent by weight of the aqueous bath. For the aforementioned photopolymerizable system in British Pat. No. 1,102,910, the preferred bath consists of an organic solvent such as acetone or petroleum ether. Etching baths for other liquid photosensitizable compositions are dependent on the aforestated difference in solubility between the liquid and solidified portion of the photosensitized relief plate.

The dwell time in the bath for the printing plate is of the order of about 5 seconds to about 10 minutes, depending upon the photocurable or photopolymerizable material employed, the thickness of the plate, the temperature of the bath, and the cleaning detergent employed in the bath. The relief obtained in such a system constitutes substantially the entire thickness of the photocurable or photopolymerizable layer right down to the support.

The printing plate is next removed from the etching bath and passed into water spray rinse tank 244 of FIG. 27 formed desirably of metal and having a series of spray units 304 disposed along one side with a second series of spray units 306 disposed along an opposite side of the interior of tank 244. The spray units 304 and 306 may be formed of a series of pipes having water-spraying elements for directing water under pressure received from water supply 308 against plate 210 substantially vertically disposed in the rinse tank. The spray of water may be heated if desired and directed such to wash the plate free of any detergent solution remaining thereon as well as any undesired materials including uncured polymeric materials if present. The water wash may be drained from tank 244 by outlet drain 302, or other suitable means as desired.

In order to facilitate rinsing wash water from the surface of plate 210, air-spraying units 310 oppositely disposed to receive the plate therebetween may be included to serve to provide an air curtain or air knife which removes substantially most of the water accumulating on the surface of the printing plate as it is removed vertically from the water spraying operation. The air to units 310 may be heated if desired.

The direction at which the air spray or water spray for the rinse tank and the air dryer may vary as desired against the printing plate. Variations in the spray pattern may be employed or the spray pattern may be uniform against the printing plate in one or another direction.

FIG. 23 presents washing tank 244, drying chamber 246 intermediate dryers 248 and plate slide transfer mechanism 250 further illustrated in FIG. 24.

Initially, during the plate washing sequence, a plate is lowered by the mechanism such as that of FIG. 22 by pulleys 251 into the tank 244 where it is cleaned as subsequently described. During the lowering for cleaning sequence, transfer plate 252, arcuate in construction, is pivoted by pneumatic operated cylinder 254 into phantom position 253.

After cleaning, plate 210 is dried in chamber 246 subsequently described and is lowered by clamp 238 to transfer plate 252 now in transfer position relative to associated arcuate transfer plate 254 pivoted on mount 256 by piston 258. When transfer plate 252 is in transfer position illustrated, release lever 260 engages a trip-switch on clamp 238 and releases the plate to the horizontal posterior photocuring transfer station of FIG. 28.

FIG. 25 diagrammatically illustrates dryer 248 with plate 210 in drying position. Air, heated as desired is circulated as indicated by pattern arrows 260. After a plate is dried, ports 262 of FIG. 26 close and the air is cycled as illustrated by flow arrows 264. This flow of heated air insures a constant-drying temperature with little loss of heated air during drying, thus insuring maximum drying efficiency with little preheating for each drying step.

Plates are received from the dryer onto posterior photocuring transfer mechanism 315 of FIGS. 28–31. Transfer is effected by rods 316 and flippers 317 moving as indicated by arrow 313 for transfer onto the mechanism from the dryer. Flippers 317 move plate 210 by contacting it during rotation of rods 316 by any suitable means not shown. A retaining wall prevents plate 210 from being transferred completely off the top of mechanism 315.

When plate 210 is transferred from the dryer, flippers 317 rotate and a second set of flippers 319 remain in noninterferring horizontal position disposed on rods 318. After plate 210 is in position on top of mechanism 315, flippers 317 move to noninterferring horizontal position whereupon flippers 319 begin rotation in direction of arrow 320 for transfer of plate 210 along the length of mechanism 315. Actinic lights 321 in supports 322 are positioned below mechanism 315 and provide the final posterior curing to plate 210 to permanently fix the photocurable composition.

After plate 210 has traversed the length of mechanism 315, it is removed by a set of flippers which rotate similarly as flippers 317 except no retaining wall is present thus permitting the plate to be deposited to a suitable receiver as desired.

The flippers used in mechanism 315 may be formed of most any material but it is desirable to use a flexible plastic or rubber to prevent damage to the plate during transfer.

The length of time during which each set of flippers operate, i.e., plate-receiving flippers from the dryer, plate transfer flippers over mechanism 315, and plate-ejecting flippers, may be controlled as desired and will depend upon the speed at which they rotate. Control means, timers and drive means for mechanism 315 although not shown are well known to the art and may be readily used and programmed as desired. In addition, various plate-retaining walls or related means may be employed to position plate 210 on top of mechanism 315 as desired.

The printing plates etched by the instant invention may be employed in various types of printing plates including, but not limited to letterpress printing, dry offset printing, flexographic printing and the like.

The various elements of the present apparatus unless otherwise indicated, may be secured to adjoining elements by any suitable means such as bolts, welding, rivets or the like. In addition, auxiliary support or reinforcement members may also be included as part of the apparatus where required.

Although a preferred embodiment of the invention has been illustrated herein, it is to be understood that various changes and modifications may be made in the construction and arrangement of elements without departing from the spirit and scope of the invention as defined.

What is claimed is:

1. An automated method for photocomposing which comprises the sequential steps:

A. transferring a sheet from a supply to a station where a photocurable composition is applied and layered to a substantially uniform thickness, said sheet capable of transmitting actinic radiation therethrough;

B. positioning a mounted transparency in a predetermined position over the substantially uniform thickness of liquid photocurable composition at a subsequent station;

C. exposing the liquid photocurable composition to actinic radiation projected through the image-bearing transparency to selectively photocure the liquid composition in image-bearing areas with the nonexposed composition portions remaining substantially liquid and removable, thereby providing a plate;

D. exposing the plate from Step C for a controlled period of time through the sheet capable of transmitting actinic radiation while passing said plate vertically upward and in exposing relationship past an actinic radiation station for photocuring a layer of composition adjacent the composition side of the sheet;

E. transferring the plate from Step D to an etching bath station;

F. immersing said plate in an etching bath by means which support the plate in a vertical position by contact with the sheet portion of the plate and without contact of remaining unexposed nonimage areas remaining on the plate, said etching bath containing a liquid maintained at a temperature sufficient to keep the nonimage area of the plate in the liquid or molten phase;

G. energizing the etching bath by means of ultrasonic energy to a degree necessary to cause cavitation and removal of substantially all of the unexposed nonimage area;

H. transferring the plate from the etching bath to a washing station;

I. air drying the water washed plate in a current of heated air at a station disposed adjacent the water spray location; and J. further exposing to actinic radiation by passing the plate in a horizontal direction over a photocuring unit to further photocure the remaining selectively photocured composition to more permanently harden, detackify, and stabilize any portions thereof which may remain partially unphotocured in situ.

2. The method of claim 1 wherein the ultrasonic energy level of the bath varies between about 18 to about 40 kilocycles.

3. The method of claim 1 wherein said final photocuring is effected during plate transfer over the photocuring station to a receiving station.

4. The method of claim 1 wherein the liquid photocurable composition is applied to the support surface by a substantially automated applicator which includes means for applying a liquid photocurable composition to the support surface and means for leveling the applied composition such to provide a substantially uniform thickness of composition over the support surface.

5. The method of claim 1 wherein heated air is directed against the applied liquid photocurable composition to provide a layer of composition substantially free of air bubbles which may be entrapped by the composition.

* * * * *